US008788357B2

(12) United States Patent
Wasicek et al.

(10) Patent No.: US 8,788,357 B2
(45) Date of Patent: Jul. 22, 2014

(54) SYSTEM AND METHOD FOR PRODUCTIZING HUMAN CAPITAL LABOR EMPLOYMENT POSITIONS/JOBS

(75) Inventors: Wyatt Wasicek, Round Rock, TX (US); Scott C. Thornburg, Yorba Linda, CA (US); Andrew A. Cullen, III, Succasunna, NJ (US)

(73) Assignee: Iqnavigator, Inc., Centennial, CO (US)

( * ) Notice: Subject to any disclaimer, the term of this patent is extended or adjusted under 35 U.S.C. 154(b) by 717 days.

(21) Appl. No.: 12/855,532

(22) Filed: Aug. 12, 2010

(65) Prior Publication Data

US 2011/0040695 A1 Feb. 17, 2011

Related U.S. Application Data

(60) Provisional application No. 61/233,199, filed on Aug. 12, 2009.

(51) Int. Cl.
*G06Q 30/00* (2012.01)

(52) U.S. Cl.
USPC .......................................................... 705/26.1

(58) Field of Classification Search
CPC .......................................... G06Q 30/06–30/08
USPC .................................................. 705/26–27.2
See application file for complete search history.

(56) References Cited

U.S. PATENT DOCUMENTS

| | | | |
|---|---|---|---|
| 4,646,250 A | 2/1987 | Childress | |
| 4,799,156 A | 1/1989 | Shavit et al. | |
| 4,937,743 A | 6/1990 | Rassman et al. | |
| 4,992,940 A | 2/1991 | Dworkin | |
| 5,117,353 A | 5/1992 | Stipanovich et al. | |
| 5,164,897 A | 11/1992 | Clark et al. | |
| 5,291,397 A | 3/1994 | Powell | |
| 5,381,332 A | 1/1995 | Wood | |
| 5,416,694 A | 5/1995 | Parrish et al. | |

(Continued)

FOREIGN PATENT DOCUMENTS

| | | |
|---|---|---|
| EP | 1195676 A2 | 4/2002 |
| JP | H08-153121 A | 6/1996 |

(Continued)

OTHER PUBLICATIONS

Tate, L., "Preparing RFPs, RFQs and Negotiating Contracts Requires Meticulous Attention to Many Details", Communications News, vol. 24, No. 12, p. 46, Dec. 1987.

(Continued)

*Primary Examiner* — Ethan D Civan
(74) *Attorney, Agent, or Firm* — Perkins Coie LLP

(57) ABSTRACT

A method includes configuring a human-capital-management (HCM) master taxonomy and a HCM language library. The HCM master taxonomy includes a plurality of levels that range from more general to more specific, each level of the plurality of levels comprising a plurality of nodes. The plurality of levels include a job-species level and a job-family level, the job-species level including a level of greatest specificity in the plurality of levels, the job-family level including a level of specificity immediately above the job-species level. In addition, the method includes transforming human-capital information via the HCM language library. Further, the method includes classifying the transformed human-capital information into a job-family node selected from the plurality of nodes at the job-family level.

42 Claims, 17 Drawing Sheets

(56) References Cited

U.S. PATENT DOCUMENTS

| | | |
|---|---|---|
| 5,493,490 A | 2/1996 | Johnson |
| 5,592,375 A | 1/1997 | Salmon et al. |
| 5,600,554 A | 2/1997 | Williams |
| 5,664,115 A | 9/1997 | Fraser |
| 5,715,402 A | 2/1998 | Popolo |
| 5,740,421 A * | 4/1998 | Palmon ........................... 1/1 |
| 5,758,328 A | 5/1998 | Giovannoli |
| 5,794,212 A | 8/1998 | Mistr, Jr. |
| 5,802,493 A | 9/1998 | Sheflott et al. |
| 5,842,178 A | 11/1998 | Giovannoli |
| 5,862,223 A | 1/1999 | Walker et al. |
| 5,907,490 A | 5/1999 | Oliver |
| 5,913,202 A | 6/1999 | Motoyama |
| 5,915,086 A | 6/1999 | Buzsaki et al. |
| 5,960,407 A | 9/1999 | Vivona |
| 5,970,475 A | 10/1999 | Barnes et al. |
| 5,978,768 A | 11/1999 | McGovern et al. |
| 5,987,464 A | 11/1999 | Schneider |
| 5,991,735 A | 11/1999 | Gerace |
| 5,995,951 A | 11/1999 | Ferguson |
| 6,014,644 A | 1/2000 | Erickson |
| 6,038,547 A | 3/2000 | Casto |
| 6,041,303 A | 3/2000 | Mathews |
| 6,049,776 A | 4/2000 | Donnelly et al. |
| 6,058,373 A | 5/2000 | Blinn et al. |
| 6,058,379 A | 5/2000 | Odom et al. |
| 6,070,143 A | 5/2000 | Barney et al. |
| 6,088,678 A | 7/2000 | Shannon |
| 6,092,050 A | 7/2000 | Lungren et al. |
| 6,092,060 A | 7/2000 | Guinta et al. |
| 6,092,197 A | 7/2000 | Coueignoux |
| 6,112,189 A | 8/2000 | Rickard et al. |
| 6,115,642 A | 9/2000 | Brown et al. |
| 6,131,087 A | 10/2000 | Luke et al. |
| 6,141,653 A | 10/2000 | Conklin et al. |
| 6,157,808 A | 12/2000 | Hollingsworth |
| 6,158,044 A | 12/2000 | Tibbetts |
| 6,161,099 A | 12/2000 | Harrington et al. |
| 6,167,385 A | 12/2000 | Hartley-Urquhart |
| 6,189,003 B1 | 2/2001 | Leal |
| 6,199,050 B1 | 3/2001 | Alaia et al. |
| 6,213,780 B1 | 4/2001 | Ho et al. |
| 6,266,659 B1 | 7/2001 | Nadkarni |
| 6,272,467 B1 | 8/2001 | Durand et al. |
| 6,275,812 B1 | 8/2001 | Haq et al. |
| 6,289,340 B1 | 9/2001 | Puram et al. |
| 6,302,695 B1 | 10/2001 | Rtischev et al. |
| 6,324,522 B2 | 11/2001 | Peterson et al. |
| 6,349,238 B1 | 2/2002 | Gabbita et al. |
| 6,356,909 B1 | 3/2002 | Spencer |
| 6,370,510 B1 | 4/2002 | McGovern et al. |
| 6,385,620 B1 | 5/2002 | Kurzius et al. |
| 6,408,337 B1 | 6/2002 | Dietz et al. |
| 6,442,528 B1 | 8/2002 | Notani et al. |
| 6,480,857 B1 | 11/2002 | Chandler |
| 6,529,909 B1 | 3/2003 | Bowman-Amuah |
| 6,556,976 B1 | 4/2003 | Callen |
| 6,601,233 B1 | 7/2003 | Underwood |
| 6,647,300 B1 | 11/2003 | Balasubramanian et al. |
| 6,658,400 B2 | 12/2003 | Perell et al. |
| 6,662,194 B1 | 12/2003 | Joao |
| 6,922,676 B2 | 7/2005 | Alnwick |
| 6,980,962 B1 | 12/2005 | Arganbright et al. |
| 7,054,821 B1 | 5/2006 | Rosenthal et al. |
| 7,089,203 B1 | 8/2006 | Crookshanks |
| 7,103,567 B2 | 9/2006 | Smukowski |
| 7,107,268 B1 | 9/2006 | Zawadzki et al. |
| 7,275,039 B2 | 9/2007 | Setteducati |
| 7,302,431 B1 | 11/2007 | Apollonsky et al. |
| 7,305,392 B1 | 12/2007 | Abrams et al. |
| 7,349,868 B2 | 3/2008 | Tenorio |
| 7,386,475 B2 | 6/2008 | Parasnis et al. |
| 7,430,523 B1 | 9/2008 | Khalidi |
| 7,437,304 B2 | 10/2008 | Barnard et al. |
| 7,451,106 B1 | 11/2008 | Gindlesperger |
| 7,457,764 B1 | 11/2008 | Bullock et al. |
| 7,523,045 B1 | 4/2009 | Walker et al. |
| 7,533,033 B1 | 5/2009 | Unite et al. |
| 7,653,583 B1 | 1/2010 | Leeb et al. |
| 7,747,457 B2 | 6/2010 | Cullen, III et al. |
| 7,805,382 B2 | 9/2010 | Rosen et al. |
| 8,041,616 B2 | 10/2011 | Cullen, III et al. |
| 8,204,820 B2 | 6/2012 | Cullen, III et al. |
| 8,364,557 B2 | 1/2013 | Cullen, III et al. |
| 2001/0044768 A1 | 11/2001 | Wares |
| 2001/0047311 A1 | 11/2001 | Singh |
| 2001/0051913 A1 | 12/2001 | Vashistha et al. |
| 2002/0002479 A1 | 1/2002 | Almog et al. |
| 2002/0042752 A1 | 4/2002 | Chaves |
| 2002/0046147 A1 | 4/2002 | Livesay et al. |
| 2002/0055870 A1 | 5/2002 | Thomas |
| 2002/0072946 A1 | 6/2002 | Richardson |
| 2002/0073082 A1 | 6/2002 | Duvillier et al. |
| 2002/0087382 A1 | 7/2002 | Tiburcio |
| 2002/0103687 A1 | 8/2002 | Kipling |
| 2002/0152133 A1 | 10/2002 | King et al. |
| 2002/0156668 A1 | 10/2002 | Morrow et al. |
| 2002/0161619 A1 | 10/2002 | Ham et al. |
| 2002/0198766 A1 | 12/2002 | Magrino et al. |
| 2002/0198818 A1 | 12/2002 | Scott et al. |
| 2003/0004850 A1 | 1/2003 | Li et al. |
| 2003/0018481 A1 | 1/2003 | Zhou et al. |
| 2003/0037032 A1 | 2/2003 | Neece et al. |
| 2003/0055694 A1 | 3/2003 | Menninger |
| 2003/0055754 A1 | 3/2003 | Sullivan |
| 2003/0083910 A1 | 5/2003 | Sayal et al. |
| 2003/0101114 A1 | 5/2003 | Delapass et al. |
| 2003/0101127 A1 | 5/2003 | Cornelius |
| 2003/0135401 A1 | 7/2003 | Parr |
| 2003/0145006 A1 | 7/2003 | Dalfsen et al. |
| 2003/0177051 A1 | 9/2003 | Driscoll et al. |
| 2003/0200150 A1 | 10/2003 | Westcott et al. |
| 2003/0200168 A1 | 10/2003 | Cullen, III et al. |
| 2003/0204439 A1 | 10/2003 | Cullen, III |
| 2003/0208434 A1 | 11/2003 | Posner |
| 2003/0212604 A1 | 11/2003 | Cullen, III |
| 2003/0216986 A1 | 11/2003 | Hassan |
| 2004/0030566 A1 | 2/2004 | Brooks Rix |
| 2004/0030590 A1 | 2/2004 | Swan et al. |
| 2004/0039681 A1 | 2/2004 | Cullen, III et al. |
| 2004/0068728 A1 | 4/2004 | Blevins |
| 2004/0093583 A1 | 5/2004 | McAnaney et al. |
| 2004/0107125 A1 | 6/2004 | Guheen et al. |
| 2004/0107405 A1 | 6/2004 | Schein |
| 2004/0158513 A1 | 8/2004 | Musacchio |
| 2004/0186852 A1 | 9/2004 | Rosen |
| 2004/0205519 A1 | 10/2004 | Chapel et al. |
| 2004/0210490 A1 | 10/2004 | Almstead et al. |
| 2004/0210510 A1 | 10/2004 | Cullen, III et al. |
| 2004/0215467 A1 | 10/2004 | Coffman et al. |
| 2004/0236598 A1 | 11/2004 | Thomsen |
| 2004/0249655 A1 | 12/2004 | Doeberl et al. |
| 2004/0260601 A1 | 12/2004 | Brief |
| 2004/0267606 A1 | 12/2004 | Brishke et al. |
| 2005/0114829 A1 | 5/2005 | Robin et al. |
| 2005/0120039 A1 | 6/2005 | Amys et al. |
| 2005/0144129 A1 | 6/2005 | Coolman et al. |
| 2005/0262008 A1 | 11/2005 | Cullen, III et al. |
| 2005/0288993 A1 | 12/2005 | Weng et al. |
| 2006/0173775 A1 | 8/2006 | Cullen et al. |
| 2006/0190391 A1 | 8/2006 | Cullen et al. |
| 2006/0259476 A1 * | 11/2006 | Kadayam et al. ................ 707/3 |
| 2007/0124196 A1 | 5/2007 | Brief et al. |
| 2007/0198968 A1 | 8/2007 | Shenfield et al. |
| 2008/0004890 A1 | 1/2008 | Hargroder |
| 2009/0248482 A1 | 10/2009 | Knyphausen et al. |
| 2010/0153863 A1 | 6/2010 | Cullen, III |
| 2010/0241482 A1 | 9/2010 | Knyphausen et al. |
| 2011/0055041 A1 | 3/2011 | Shaw et al. |
| 2011/0112945 A1 | 5/2011 | Cullen, III et al. |
| 2012/0215711 A1 | 8/2012 | Brief et al. |
| 2013/0317942 A1 | 11/2013 | Cullen, III |

(56) References Cited

U.S. PATENT DOCUMENTS

FOREIGN PATENT DOCUMENTS

| | | |
|---|---|---|
| JP | 09-223008 A | 8/1997 |
| JP | 11-345259 A | 12/1999 |
| JP | 2001-325299 A | 11/2001 |
| JP | 2002-041835 A | 2/2002 |
| JP | 2002-149959 A | 5/2002 |
| JP | 2002-531890 A | 9/2002 |
| JP | 2002-366763 A | 12/2002 |
| JP | 2003-058030 A | 2/2003 |
| JP | 2003-067188 A | 3/2003 |
| JP | 2003-532201 A | 10/2003 |
| JP | 2004-086757 A | 3/2004 |
| JP | 2004-234548 A | 8/2004 |
| JP | 2004-252951 A | 9/2004 |
| JP | 2004-264880 A | 9/2004 |
| JP | 2004-527805 A | 9/2004 |
| JP | 2005-018327 A | 1/2005 |
| JP | 2005-044259 A | 2/2005 |
| RU | 2165679 C1 | 4/2001 |
| WO | WO-00/33187 A1 | 6/2000 |
| WO | WO-/00/50970 | 8/2000 |
| WO | WO-0108067 A1 | 2/2001 |
| WO | WO-01/14962 A1 | 3/2001 |
| WO | WO-01/48656 | 7/2001 |
| WO | WO-02/08868 | 1/2002 |
| WO | WO-02/25544 | 3/2002 |
| WO | WO-02/41270 A1 | 5/2002 |
| WO | WO-2005/010789 A1 | 2/2005 |

OTHER PUBLICATIONS

Hirning, J., "Standing up to the Standards Strain", Quality, vol. 34, No. 2, p. 96, Feb. 1995.
Feder, B.J., "True Grit in the Gritty Inner City; Some Dreams Come True, but Company Fights for Life", New York Times, Late Edition-Final Edition, Jul. 10, 1998, p. 1, col. 2.
Anon, "Cephren Launches MarketNet Bidding Service, Providing the Construction Industry With an Efficient Way to Procure Goods and Services Online", Business Wire, May 30, 2000, 3 pages.
Young, Lee W., "International Search Report" for PCT/US10/47176 as mailed Oct. 14, 2010, 3 pages.
Copenheaver, Blaine R., "International Search Report" for PCT/US2010/045349 as mailed Oct. 6, 2010 (4 pages).
Web Archive of "nextSource" web page, "People Blue Book™, Introducing the nextSource People Blue Book" retrieved from [URL: http://web.archive.org/web/20020206061453/http://nextsource.com/services/people_blue . . . ], archived on Feb. 6, 2002, 1 page.
U.S. Bureau of Labor Statistics, "2000 Standard Occupational Classification (SOC) User Guide", retrieved from [URL: http://data.bls.gov/cgi-bin/print.pl/soc/socguide.htm] on Dec. 27, 2011, 5 pages.
U.S. Appl. No. 12/342,116, filed Dec. 23, 2008, Cullen.
www.marketing.ebreviate.com; "Overview"; Company Information of eBreviate; Feb. 11, 2002; pp. 1-16.
www.chimes.net; "Chimes Streamlines & Digitizes RFP Administration and Project Management with Launch of Chimes PM";-Press Release from Chimes, Inc.; Feb. 25, 2002; pp. 1-4.
www.chimes.net; "Chimes, Inc. Extends Human Capital Management Solution Beyond Contingent Workforce with Launch of Centralized Applicant Management—CAM—Program"; News Room from Chimes, Inc.; Jun. 28, 2001; pp. 1-2.
www.emptoris.com; "Overview"; Company Overview of Emptoris; Apr. 15, 2002; pp. 1-18.
Screenshots of Volt Information Sciences, www.volt.com, Feb. 21, 1999, pp. 1-24, retrieved from: Google.com and archive.org.
Torres, Giselle; "High-Voltage Staffing Service Arrives in Puerto Rico"; Caribbean Business; Oct. 23, 1997, p. 1 (retrived from: Dialog, file 16).
"Volt Information Sciences—Facilities & Equipment", Annual Report, 1989, p. 1 (retrieved from : Dialog, file 160.
"Volt Information Sciences to Purchase Portions of Two Lucent Technologies Subsidiaries", PR Newswire, Nov. 17, 1999, pp. 1-3, (retrieved from: Dialog, file 16.
Consol (www, procurestaff.com via http://web.archive.org, copyright 2003) pp. 1-31.
Cullen, Andrew A. III, "Declaration of Andrew A. Cullen III" , 41 pages, Jun. 18, 2008.
Leipold et al., "The World Bank e-Procurement for the Selection of Consultants: Challenges and Lessons Learned" Journal of Public Procurement, 2004, vol. 4, Issue 3, pp. 319-339.
Dysart, J., "The Data Exchange," DG Review, vol. 11, No. 9, p. 37, Mar. 11, 1991.
Anon., "Primavera Systems; Primavera, PurchasePro.Com Create E-Commerce Marketplace for Construction Industry," M2 Presswire, Sep. 22, 1999.
Rawdon, S., "Online Bidding Options May Be Web's Best Secret," Business First-Columbus, vol. 18, No. 33, p. B11, Apr. 5, 2002.
"nextSource Announces Launch of its Multiple Listing Staffing Association." Business Wire, p. 2196, Apr. 16, 2002.
Definition of prose from Dictionary.com, retrieved from [http://dictionary.reference.com/browse/prose] on Aug. 7, 2008.
Herman, Susan J., Hiring Right: A Practical Guide. SAGE. 1994. pp. 23-25.
Cullen, A., Suppliers of Technical Nonpayroll Workers, (2 pages), Dec. 31, 1997.
Cullen, A., Skills Questionnaire, (5 pages), May 21, 1998.
Cullen, A., Skills Environment, (1 page), Jul. 2, 1998.
Cullen, A., Jobs Listing, (31 pages), Feb. 24, 1999.
Brief, V., Overview of Volt's HRP Application, (3 pages), Feb. 1999.
Bajari et al. (Bajari), "Incentives versus transaction cost: a theory of procurement contracts", Rand Journal of Economics, vol. 32, No. 3, Autumn 2001, pp. 387-407.

\* cited by examiner

| | Stage.JobVectorHeader | —62 |
|---|---|---|
| PK | JobVectorHeaderId | |
| | RawJobTitle —604<br>RawSkillsList —606<br>RawProduct —608<br>RawBusinessInfo —610<br>RawDateRange —612<br>RawJobPlace —614<br>RawJobDescription —616 | |

FIG. 6

SYSTEM AND METHOD FOR PRODUCTIZING HUMAN CAPITAL LABOR EMPLOYMENT POSITIONS/JOBS

CROSS-REFERENCE TO RELATED APPLICATIONS

This Application claims priority from, and incorporates by reference the entire disclosure of, U.S. Provisional Application No. 61/233,199 filed on Aug. 12, 2009.

BACKGROUND

1. Technical Field

This invention relates generally to electronic classification of data and more particularly, but not by way of limitation, to a system and method for classifying human-resource information into a master taxonomy.

2. History of Related Art

Human-capital management (HCM) business entities have for decades unsuccessfully endeavored to establish an industry-standard job-classification taxonomy and data-management solution that adequately enables productizing of human-capital resources. Although a variety of widely-recognized taxonomic solutions (e.g., Standard Occupational Classification and Major Occupational Groups) have been developed and implemented, these solutions have proven to be significantly deficient in facilitating rudimentary HCM data-management requirements.

For example, existing taxonomic structures/solutions do not logically relate to how HCM business entities manage, deploy and analyze human-capital resources. The existing taxonomic structures/solutions were developed external to a HCM market segment and therefore are not sufficiently granular to support human-resource productizing. By way of further example, fine-grain attributes applicable to jobs, even when combined with traditional clustering methods, are not categorized, prioritized, contextualized or applied so as to drive accurate classification necessary to support the HCM market segment.

Because of these deficiencies, it has become standard practice within the HCM market segment for HCM business entities to develop custom job-classification constructs. Additionally, these deficiencies have in many cases forced customers (e.g., those that consume large numbers of personnel, temporary staffing) to also develop custom job-classification constructs. A result is an industry in which hundreds and perhaps thousands of disparate job-classification schemas are utilized.

SUMMARY OF THE INVENTION

In one embodiment, a method includes configuring a human-capital-management (HCM) master taxonomy and a HCM language library. The HCM master taxonomy includes a plurality of levels that range from more general to more specific, each level of the plurality of levels comprising a plurality of nodes. The plurality of levels include a job-species level and a job-family level, the job-species level including a level of greatest specificity in the plurality of levels, the job-family level including a level of specificity immediately above the job-species level. In addition, the method includes transforming human-capital information via the HCM language library. Further, the method includes classifying the transformed human-capital information into a job-family node selected from the plurality of nodes at the job-family level.

In another embodiment, a computer-program product includes a computer-usable medium having computer-readable program code embodied therein, the computer-readable program code adapted to be executed to implement a method. The method includes configuring a human-capital-management (HCM) master taxonomy and a HCM language library. The HCM master taxonomy includes a plurality of levels that range from more general to more specific, each level of the plurality of levels comprising a plurality of nodes. The plurality of levels include a job-species level and a job-family level, the job-species level including a level of greatest specificity in the plurality of levels, the job-family level including a level of specificity immediately above the job-species level. In addition, the method includes transforming human-capital information via the HCM language library. Further, the method includes classifying the transformed human-capital information into a job-family node selected from the plurality of nodes at the job-family level.

The above summary of the invention is not intended to represent each embodiment or every aspect of the present invention.

BRIEF DESCRIPTION OF THE DRAWINGS

A more complete understanding of the method and apparatus of the present invention may be obtained by reference to the following Detailed Description when taken in conjunction with the accompanying Drawings wherein:

FIG. 6 illustrates a raw-data data structure that may encapsulate raw data from an input record;

DETAILED DESCRIPTION OF ILLUSTRATIVE EMBODIMENTS OF THE INVENTION

Various embodiments of the present invention will now be described more fully with reference to the accompanying drawings. The invention may, however, be embodied in many different forms and should not be constructed as limited to the embodiments set forth herein; rather, the embodiments are provided so that this disclosure will be thorough and complete, and will fully convey the scope of the invention to those skilled in the art.

Figure 1A:
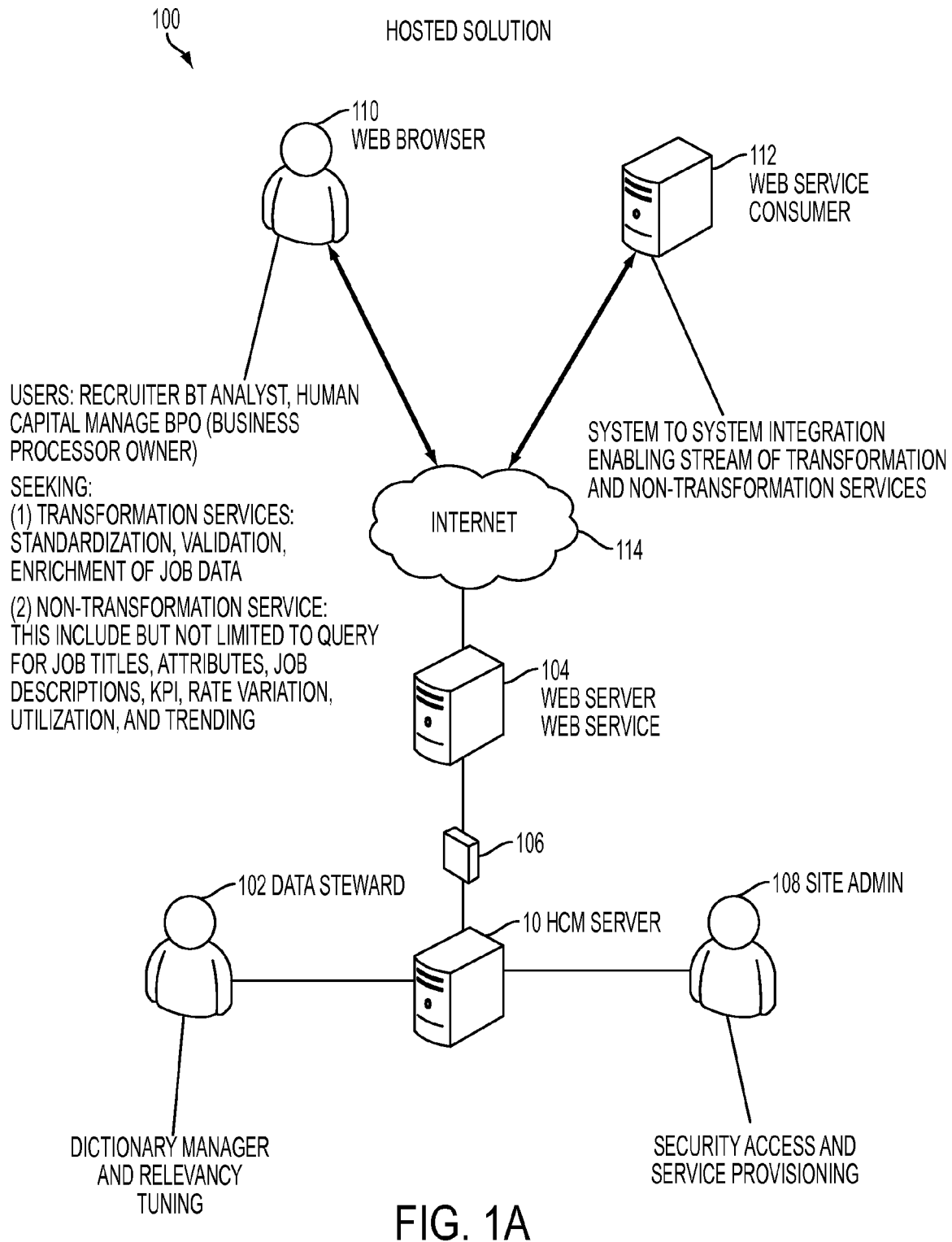
FIG. 1A illustrates a system that may be used to ingest, classify and leverage information for a subject-matter domain.

FIG. 1A illustrates a system 100 that may be used to ingest, classify and leverage information for a subject-matter domain. The system 100 may include, for example, a subject-matter-domain server 10, a data steward 102, a web server 104, a network switch 106, a site administrator 108, a web browser 110, a web-service consumer 112 and a network 114. In various embodiments, the web server 104 may provide web services over the network 114, for example, to a user of the web browser 110 or the web-service consumer 112. In a typical embodiment, the provided web services are enabled by the subject-matter-domain server 10. The web server 104 and the subject-matter-domain server are typically communicably coupled via, for example, the network switch 106. The data steward 102 may maintain and provide subject-matter-expertise resident on the subject-matter-domain server 10. In a typical embodiment, the site administrator may, for example, define and implement security policies that control access to the subject-matter-domain server 10. Exemplary functionality of the web server 104 and the subject-matter-domain server 10 will be described in more detail with respect to the ensuing FIGURES.

Figure 1B:
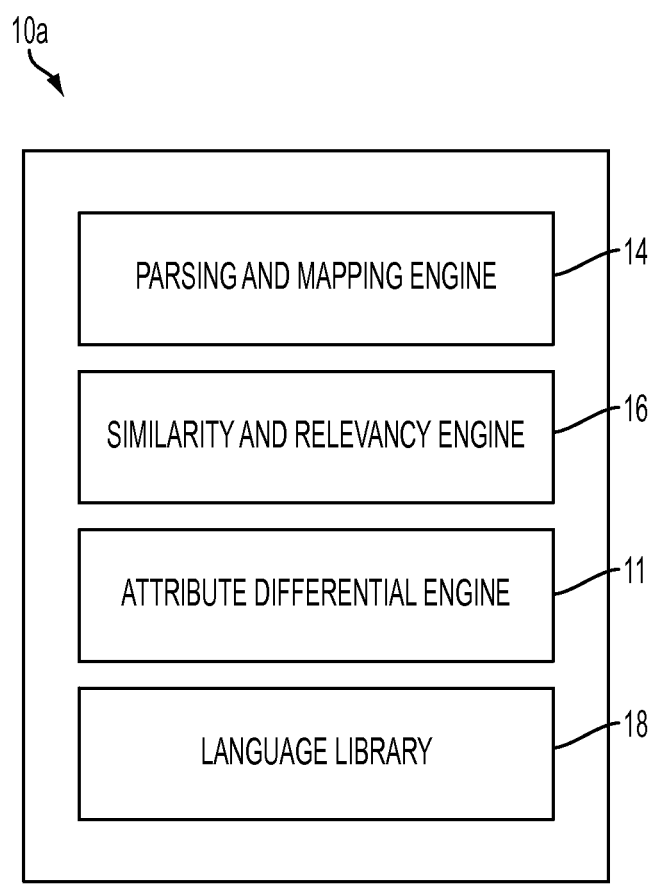
FIG. 1B illustrates various hardware or software components that may be resident and executed on a subject-matter-domain server.

FIG. 1B illustrates various hardware or software components that may be resident and executed on a subject-matter-domain server 10a. In various embodiments, the subject-matter-domain server 10a may be similar to the subject-matter-domain server 10 of FIG. 1A. In a typical embodiment, the subject-matter-domain server 10a may include a parsing-and-mapping engine 14, a similarity-and-relevancy engine 16, an attribute-differential engine 11 and a language library 18. Exemplary embodiments of the parsing-and-mapping engine 14, the similarity-and-relevancy engine 16, the attribute-differential engine 11 and the language library 18 will be discussed with respect to FIG. 2 and the ensuing Figures.

Figure 2:
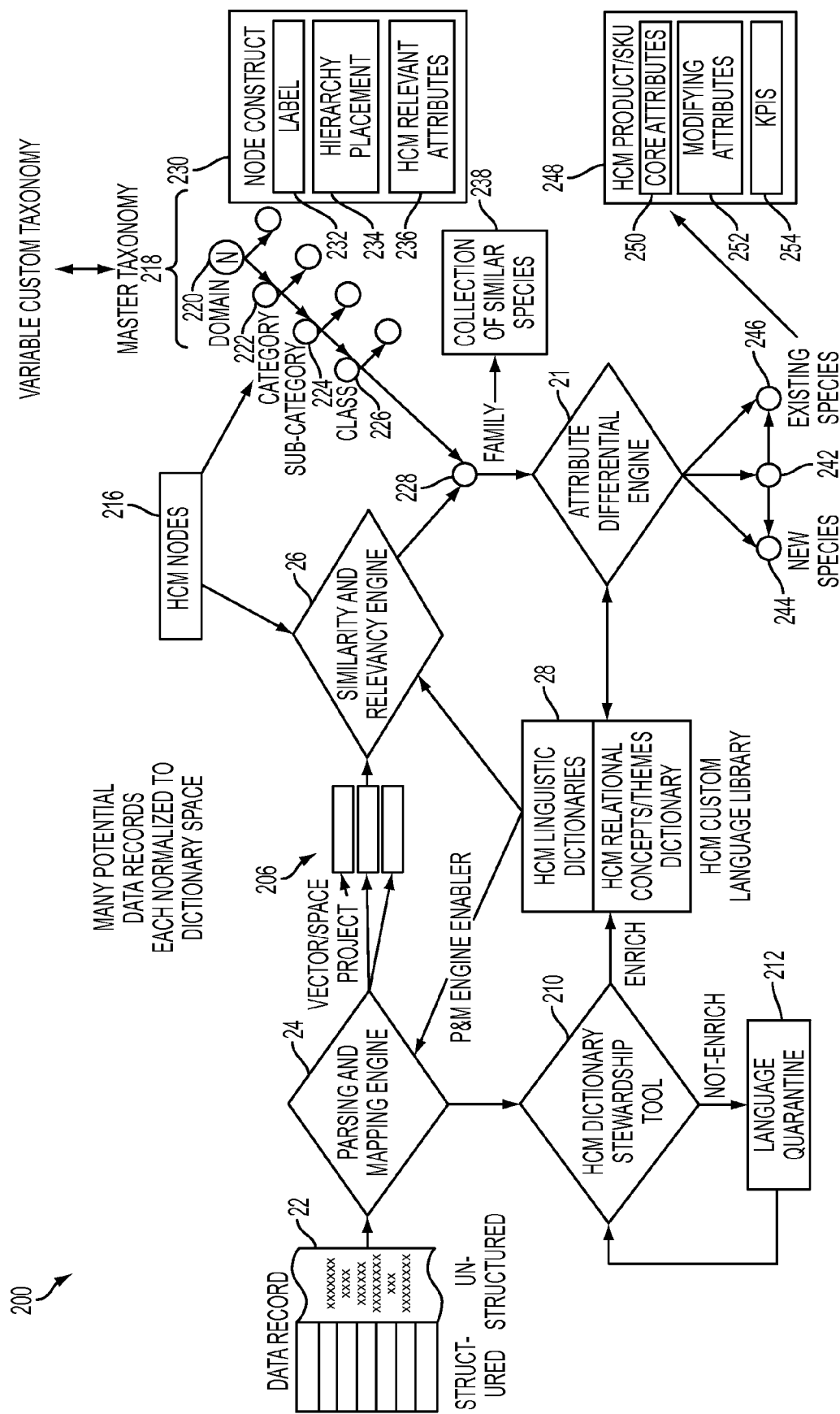
FIG. 2 illustrates a flow that may be used to ingest, classify and leverage information for the subject-matter domain.

FIG. 2 illustrates a flow 200 that may be used to ingest, classify and leverage information for the subject-matter domain. As will be described in more detail in the foregoing, in a typical embodiment, a language library 28 enables numerous aspects of the flow 200. In a typical embodiment, the language library 28 is similar to the language library 18 of FIG. 1B. The language library 28, in a typical embodiment, includes a collection of dictionaries selected and enriched via expertise in the subject-matter domain. In some embodiments, for example, the subject-matter domain may be human-capital management (HCM). In a typical embodiment, a set of subject dictionaries within the collection of dictionaries collectively define a vector space for the subject-matter domain. Other dictionaries may also be included within the collection of dictionaries in order to facilitate the flow 200. For example, one or more contextual dictionaries may provide context across the set of subject dictionaries. In various embodiments, the language library 28, via the collection of dictionaries, is operable to encapsulate and provide access to knowledge, skill and know-how concerning, for example, what words and phrases of the input record 22 may mean in the subject-matter domain.

The flow 200 typically begins with an input record 22 for ingestion and classification. In various embodiments, the input record 22 may be either a structured record or an unstructured record. As used herein, a structured record is a record with pre-defined data elements and known mappings to the vector space for the subject-matter domain. Conversely, as used herein, an unstructured record is a record that lacks pre-defined data elements and/or known mappings to the vector space. Thus, the input record 22 may be, for example, a database, a text document, a spreadsheet or any other means of conveying or storing information. Substantively, the input record 22 typically contains information that it is desirable to classify, in whole or in part, into a master taxonomy 218. In one embodiment, for example, résumés, job descriptions and other human-capital information may be classified into a human-capital-management (HCM) master taxonomy.

A parsing-and-mapping engine 24 typically receives the input record 22 and operates to transform the input record 22 via the language library 28. The parsing-and-mapping engine 24 is typically similar to the parsing-and-mapping engine 14 of FIG. 1B. In a typical embodiment, the parsing-and-mapping engine 24 may parse the input record 22 into linguistic units. Depending on, inter alia, whether the input record 22 is a structured record or an unstructured record, various methodologies may be utilized in order to obtain the linguistic units. The linguistic units may be, for example, words, phrases, sentences or any other meaningful subset of the input record 22. In a typical embodiment, the parsing-and-mapping engine 24 projects each linguistic unit onto the vector space. The projection is typically informed by the language library 28, which is accessed either directly or via a dictionary-stewardship tool 210. Although illustrated separately in FIG. 2, in various embodiments, the dictionary-stewardship tool 210 and the language quarantine 212 may be part of the language library 28.

The dictionary-stewardship tool 210 generally operates to identify and flag "noise words" in the input record 22 so that the noise words may be ignored. Noise words may be considered words that have been predetermined to be relatively insignificant such as, for example, by inclusion in a noise-words dictionary. For example, in some embodiments, articles such as 'a' and 'the' may be considered noise words. In a typical embodiment, noise words are not removed from the input record 22 but instead are placed in a language quarantine 212 and ignored for the remainder of the flow 200.

The dictionary-stewardship tool 210 also is typically operable to place into the language quarantine 212 linguistic units that are not able to be enriched by the language library 28. In some embodiments, these linguistic units are not able to be enriched because no pertinent information concerning the linguistic units is able to be obtained from the language library 28. In a typical embodiment, the dictionary-stewardship tool 210 may track the linguistic units that are not able to be enriched and a frequency with which the linguistic units appear. As the frequency becomes statistically significant, the dictionary-stewardship tool 210 may flag such linguistic units for possible future inclusion in the language library 28.

The parsing-and-mapping engine 24 generally projects the linguistic unit onto the vector space to produce a multidimensional vector 206. Each dimension of the multidimensional vector 206 generally corresponds to a subject dictionary from the set of subject dictionaries in the language library 28. In that way, each dimension of the multidimensional vector 206 may reflect one or more possible meanings of the linguistic unit and a level of confidence in those possible meanings.

A similarity-and-relevancy engine 26, in a typical embodiment, is operable to receive the multidimensional vector 206, reduce the number of possible meanings for the linguistic units and begin classification of the linguistic units in the master taxonomy 218. The similarity-and-relevancy engine is typically similar to the similarity-and-relevancy engine 16 of FIG. 1B. The master taxonomy 218 includes a plurality of nodes 216 that, in various embodiments, may number, for example, in the hundreds, thousands or millions. The master taxonomy 218 is typically a hierarchy that spans a plurality of levels that, from top to bottom, range from more general to more specific. The plurality of levels may include, for example, a domain level 220, a category level 222, a subcategory level 224, a class level 226, a family level 228 and a species level 238. Each node in the plurality of nodes 216 is typically positioned at one of the plurality of levels of the master taxonomy 218.

Additionally, each node in the plurality of nodes 216 may generally be measured as a vector in the vector space of the subject-matter domain. In various embodiments, the vector may have direction and magnitude in the vector space based on a set of master data. The set of master data, in various embodiments, may be data that has been reliably matched to ones of the plurality of nodes 216 in the master taxonomy 218 by experts in the subject-matter domain. One of ordinary skill in the art will appreciate that, optimally, the set of master data is large, diverse and statistically normalized. Furthermore, as indicated by a node construct 230, each node in the plurality of nodes 216 may have a label 232, a hierarchy placement 234 that represents a position of the node in the master taxonomy 218 and attributes 236 that are relevant to the subject-matter domain. The attributes 236 generally include linguistic units from data in the set of master data that have been reliably matched to a particular node in the plurality of nodes 216.

The similarity-and-relevancy engine 26 typically uses a series of vector-based computations to identify a node in the plurality of nodes 216 that is a best-match node for the multidimensional vector 206. In addition to being a best match based on the series of vector-based computations, in a typical embodiment, the best-match node must also meet certain pre-defined criteria. The pre-defined criteria may specify, for example, a quantitative threshold for accuracy or confidence in the best-match node.

In a typical embodiment, the similarity-and-relevancy engine 26 first attempts to identify the best-match node at the family level 228. If none of the nodes in the plurality of nodes 216 positioned at the family level 228 meets the predetermined criteria, the similarity-and-relevancy engine 26 may move up to the class level 226 and again attempt to identify the best-match node. The similarity-and-relevancy engine 26 may continue to move up one level in the master taxonomy 218 until the best-match node is identified. As will be described in more detail below, when the master taxonomy is based on a large and diverse set of master data, it is generally a good assumption that the similarity- and relevancy engine 26 will be able to identify the best-match node at the family level 228. In that way, the similarity-and-relevancy engine 26 typically produces, as the best-match node, a node in the plurality of nodes 216 that comprises a collection of similar species at the species level 238 of the master taxonomy 218. In a typical embodiment, the collection of similar species may then be processed by an attribute-differential engine 21.

In a typical embodiment, each node at the species level 238 may have a product key 248 that defines the node relative to a spotlight attribute. The product key 248 may include, for example, a set of core attributes 250, a set of modifying attributes 252 and a set of key performance indicators (KPIs) 254. The spotlight attribute, in a typical embodiment, is an attribute in the set of core attributes 250 that is of particular interest for purposes of distinguishing one species from another species. For example, in a human-capital-management master taxonomy for a human-capital-management subject-matter domain, the spotlight attribute may be a pay rate for a human resource. By way of further example, in a life-insurance master taxonomy for a life-insurance subject-matter domain, the spotlight attribute may be a person's life expectancy.

The core attributes 250 generally define a node at the species level 238. The modifying attributes 252 are generally ones of the core attributes that differentiate one species from another. The KPIs 254 are generally ones of the modifying attributes that significantly affect the spotlight attribute and therefore may be considered to statistically drive the spotlight attribute. In a typical embodiment, the attribute-differential engine 21 is operable to leverage the KPIs 254 in order to compare an unclassified vector 242 with each species in the collection of similar species. The unclassified vector 242, in a typical embodiment, is the multidimensional vector 206 as modified and optimized by the similarity-and-relevancy engine 26.

In a typical embodiment, the attribute-differential engine 21 is operable to determine whether the unclassified vector 242 may be considered a new species 244 or an existing species 246 (i.e., a species from the collection of similar species). If the unclassified vector 242 is determined to be the existing species 244, the unclassified vector 242 may be so classified and may be considered to have the spotlight attribute for the existing species 244. If the unclassified vector 242 is determined to be the new species 246, the new species 244 may be defined using the attributes of the unclassified vector 242. A spotlight attribute for the new species 244 may be defined, for example, as a function of a degree of similarity, or distance, from a most-similar one of the collection of similar species, the distance being calculated via the KPIs 254.

FIGS. 3-14 illustrate exemplary embodiments that utilize a human-capital management (HCM) vector space and leverage expertise in a HCM subject-matter domain. As one of ordinary skill in the art will appreciate, HCM may involve, for example, the employment of human capital, the development of human capital and the utilization and compensation of human capital. One of ordinary skill in the art will appreciate that these exemplary embodiments with respect to HCM are presented solely to provide examples as to how various principles of the invention may be applied and should not be construed as limiting.

As one of ordinary skill in the art will appreciate, HCM may involve, for example, the development of labor-related issues that impact a business's strategic and operational objectives. Human-capital management may include, for example, the employment of human resource and the development of human resources; and the utilization, maintenance, and compensation human resources.

Figure 3:
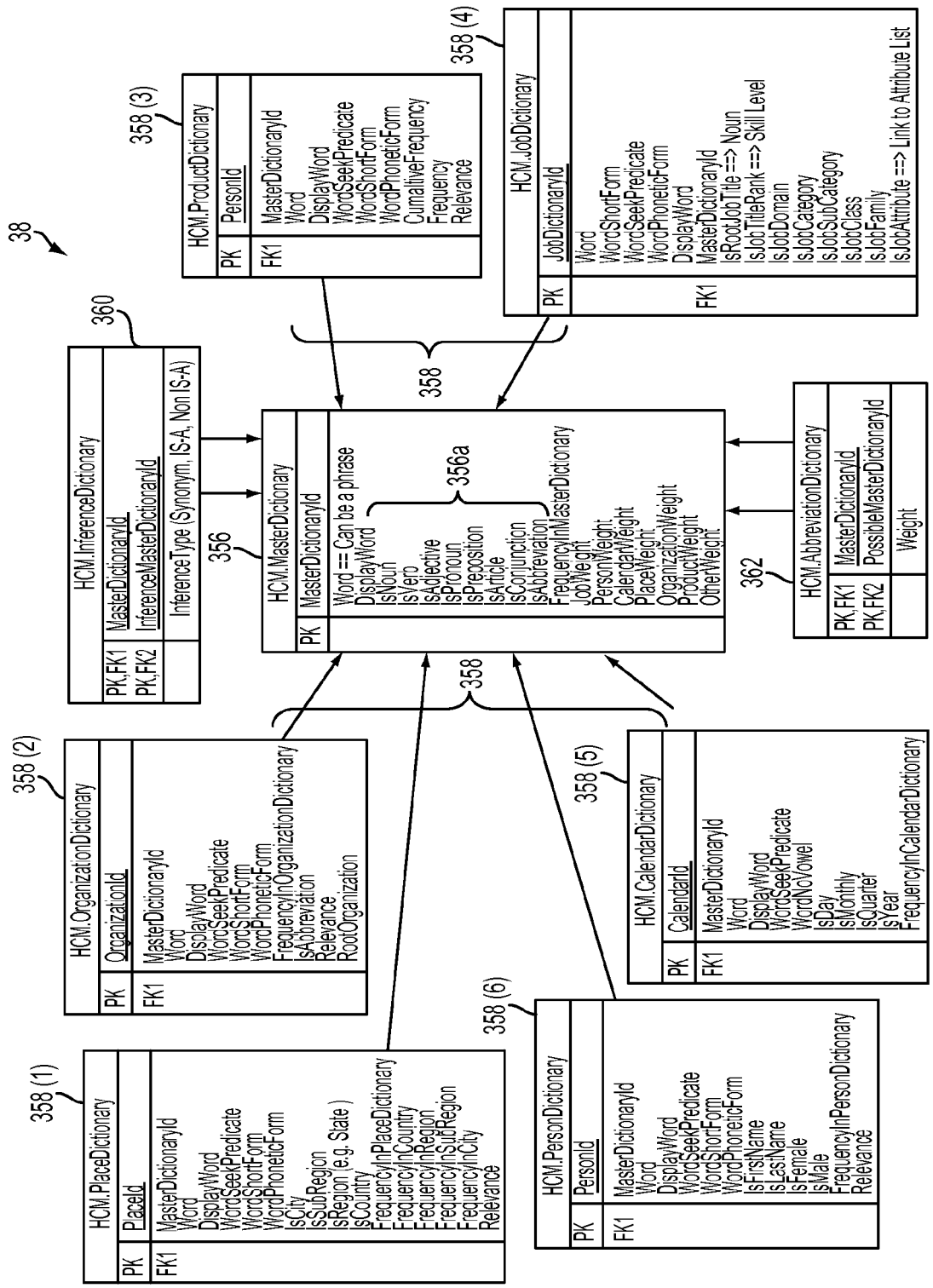
FIG. 3 illustrates an exemplary HCM language library.

FIG. 3 illustrates a HCM language library 38. In various embodiments, the HCM language library 38 may be similar to the language library 28 of FIG. 2 and the language library 18 of FIG. 1B. The HCM language library 38 typically includes a HCM master dictionary 356, an abbreviation dictionary 362, an inference dictionary 360 and a plurality of subject dictionaries 358 that, in a typical embodiment, collectively define the HCM vector space. The plurality of subject dictionaries 358 may include a place dictionary 358(1), an organization dictionary 358(2), a product dictionary 358(3), a job dictionary 358(4), a calendar dictionary 358(5) and a person dictionary 358(6). For example, the plurality of subject dictionaries 358 may include, respectively, names of places (e.g., "California"), names of organizations or business that may employ human capital (e.g., "Johnson, Inc."), names of products (e.g., "Microsoft Windows"), job positions (e.g., "database administrator"), terms relating to calendar dates (e.g., "November") and human names (e.g., "Jane" or "Smith"). In a typical embodiment, the abbreviation dictionary 362, the inference dictionary 360 and, for example, a noise words dictionary may be considered HCM-contextual dictionaries because each such dictionary provides additional context across the plurality of subject dictionaries.

In a typical embodiment, the HCM master dictionary 356 is a superset of the abbreviation dictionary 362, the inference dictionary 360 and the plurality of subject dictionaries 358. In that way, the HCM master dictionary 356 generally at least includes each entry present in the abbreviation dictionary 362, the inference dictionary 360 and the plurality of subject dictionaries 358. The HCM master dictionary 356 may, in a typical embodiment, include a plurality of Boolean attributes 356a that indicate parts of speech for a linguistic unit. The plurality of Boolean attributes 356a may indicate, for example, whether a linguistic unit is a noun, verb, adjective, pronoun, preposition, article, conjunction or abbreviation. As illustrated in FIG. 3, each of the plurality of subject dictionaries 358 may also include relevant Boolean attributes.

In a typical embodiment, the HCM master dictionary 356, the abbreviation dictionary 362, the inference dictionary 360 and the plurality of subject dictionaries 358 may be created and populated, for example, via a set of HCM master data. The set of HCM master data, in various embodiments, may be data that has been input into the HCM language library 38, for example, by experts in the HCM subject-matter domain. In some embodiments, standard dictionary words and terms from various external dictionaries may be integrated into, for example, the plurality of subject dictionaries 358.

Figure 4:
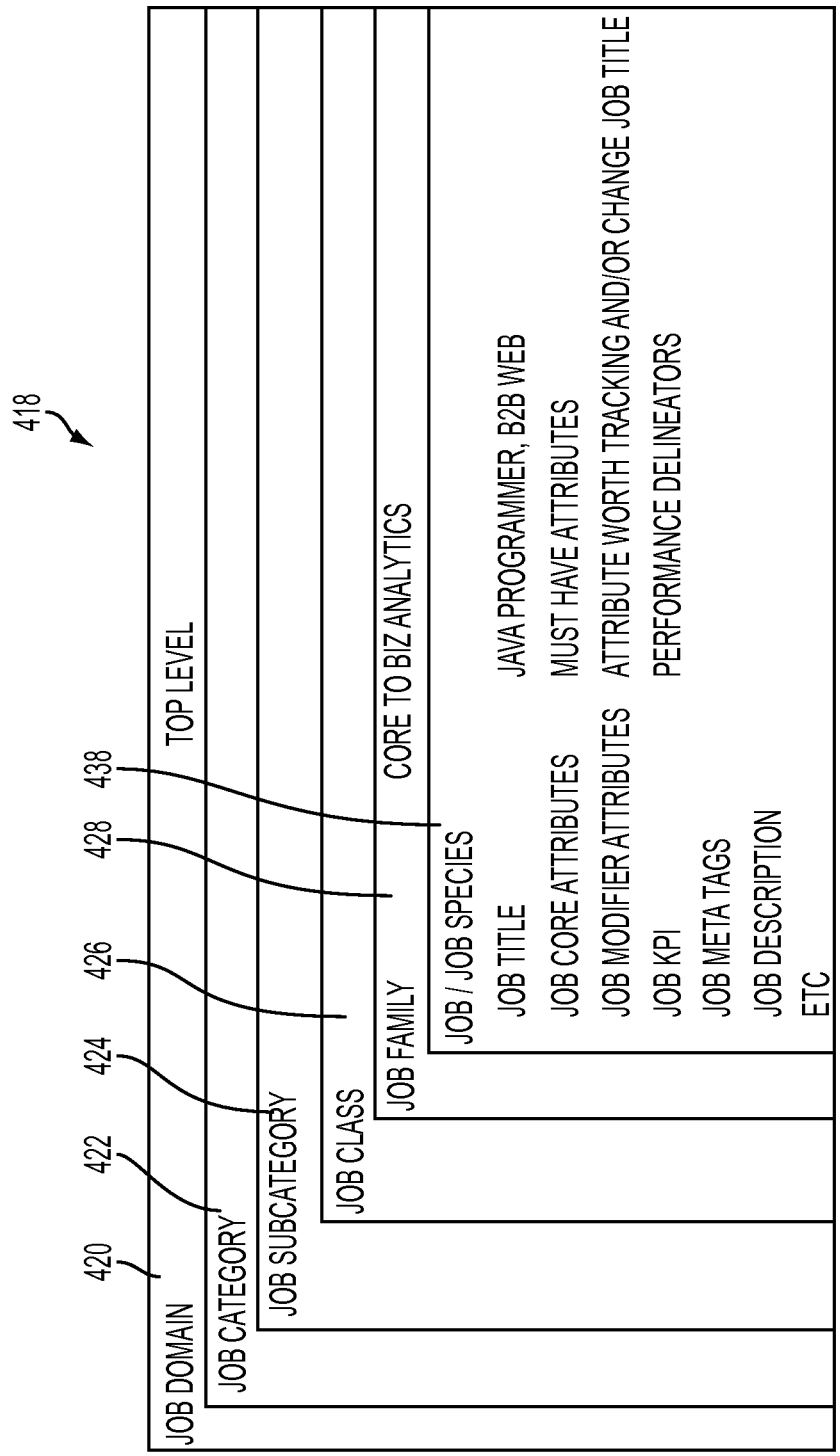
FIG. 4 illustrates an exemplary HCM master taxonomy.

FIG. 4 illustrates a HCM master taxonomy 418 that may be used, for example, to classify human-capital information such as, for example, résumés, job descriptions and the like. In various embodiments, the HCM master taxonomy 418 may be similar to the master taxonomy 218 of FIG. 2. The HCM master taxonomy 418 typically includes a job-domain level 420, a job-category level 422, a job-subcategory level 424, a job-class level 426, a job-family level 428 and a job-species level 438.

In various embodiments, the HCM master taxonomy 418 and the HCM language library 38 are configured and pre-calibrated, via HCM subject-matter expertise, to a set of HCM master data in manner similar to that described with respect to the language library 28 and the master taxonomy 218 of FIG. 2. More particularly, the set of HCM master data may include a series of records such as, for example, job descriptions, job titles, résumés segments, and the like. As described with respect to the master taxonomy 218 of FIG. 2, each node in the HCM master taxonomy 418 may be measured as a vector in the HCM vector space of the HCM subject-matter domain. Therefore, each node in the HCM master taxonomy 418 may have direction and magnitude in the HCM vector space based on the set of HCM master data. The set of HCM master data, in various embodiments, may be data that has been reliably matched to nodes of the HCM master taxonomy 418 by experts in the HCM subject-matter domain. One of ordinary skill in the art will appreciate that, optimally, the set of HCM master data is large, diverse and statistically normalized.

Figure 5:
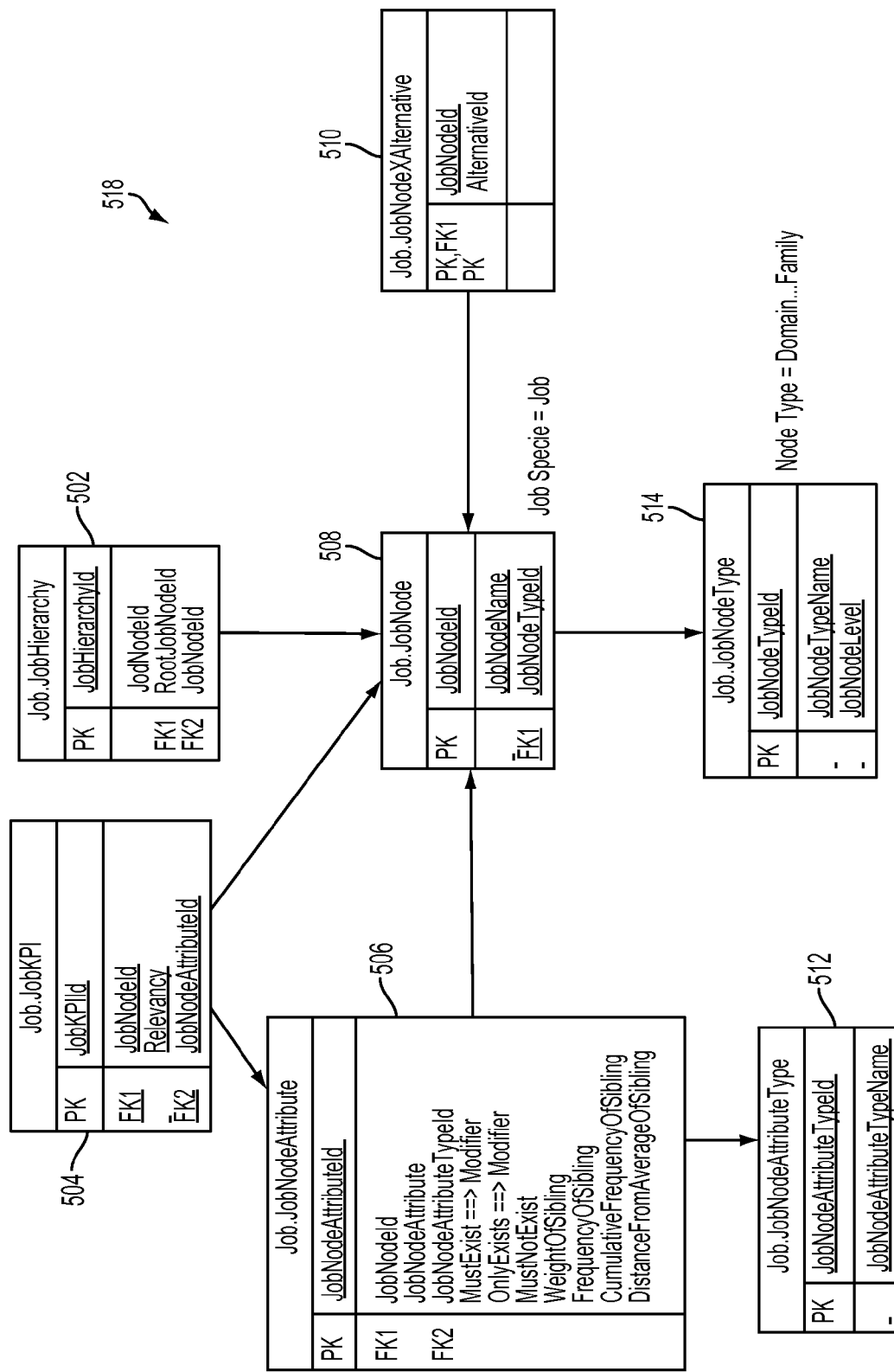
FIG. 5 illustrates exemplary database tables for a HCM master taxonomy.

FIG. 5 illustrates exemplary database tables for a HCM master taxonomy 518. In a typical embodiment, a job hierarchy 502 may include one or more job nodes 508. Each of the one or more job nodes 508 may typically have a job-node type 514. The job-node type 514 may be, for example, one of the following described with respect to FIG. 4: the job-domain level 420, the job-category level 422, the job-subcategory level 424, the job-class level 426, the job-family level 428 and the job-species level 438. Each of the one or more job nodes 508 may have one or more job-node attributes 506. In a typical embodiment, one or more of the job-node attributes 506 may be KPIs for a spotlight attribute of the one or more job nodes 508. In a typical embodiment, each of the job-node attributes 506 may have a job-node-attribute type 512. A job-node alternate 510 may, in a typical embodiment, provide an alternate means of identifying the job node 508.

FIG. 6 illustrates a raw-data data structure 62 that may encapsulate raw data from an input record such as, for example, the input record 22 of FIG. 2. The raw data may be converted and conformed to the raw-data data structure 62 so that the raw data is usable by a parsing-and-mapping engine such as, for example, the parsing-and-mapping engine 24 of FIG. 2. In a typical embodiment, the raw-data data structure 62 may include, for example, a job-title attribute 604, a skills-list attribute 606, a product attribute 608, an organization-information attribute 610, a date-range attribute 612, a job-place attribute 614 and a job-description attribute 616. Various known technologies such as, for example, optical character recognition (OCR) and intelligent character recognition (ICR) may be utilized to convert the raw data into the raw-data data structure 62. One of ordinary skill in the art will recognize that various known technologies and third-party solutions may be utilized to convert the raw data into the raw-data data structure 702 of FIG. 7.

Figure 7:
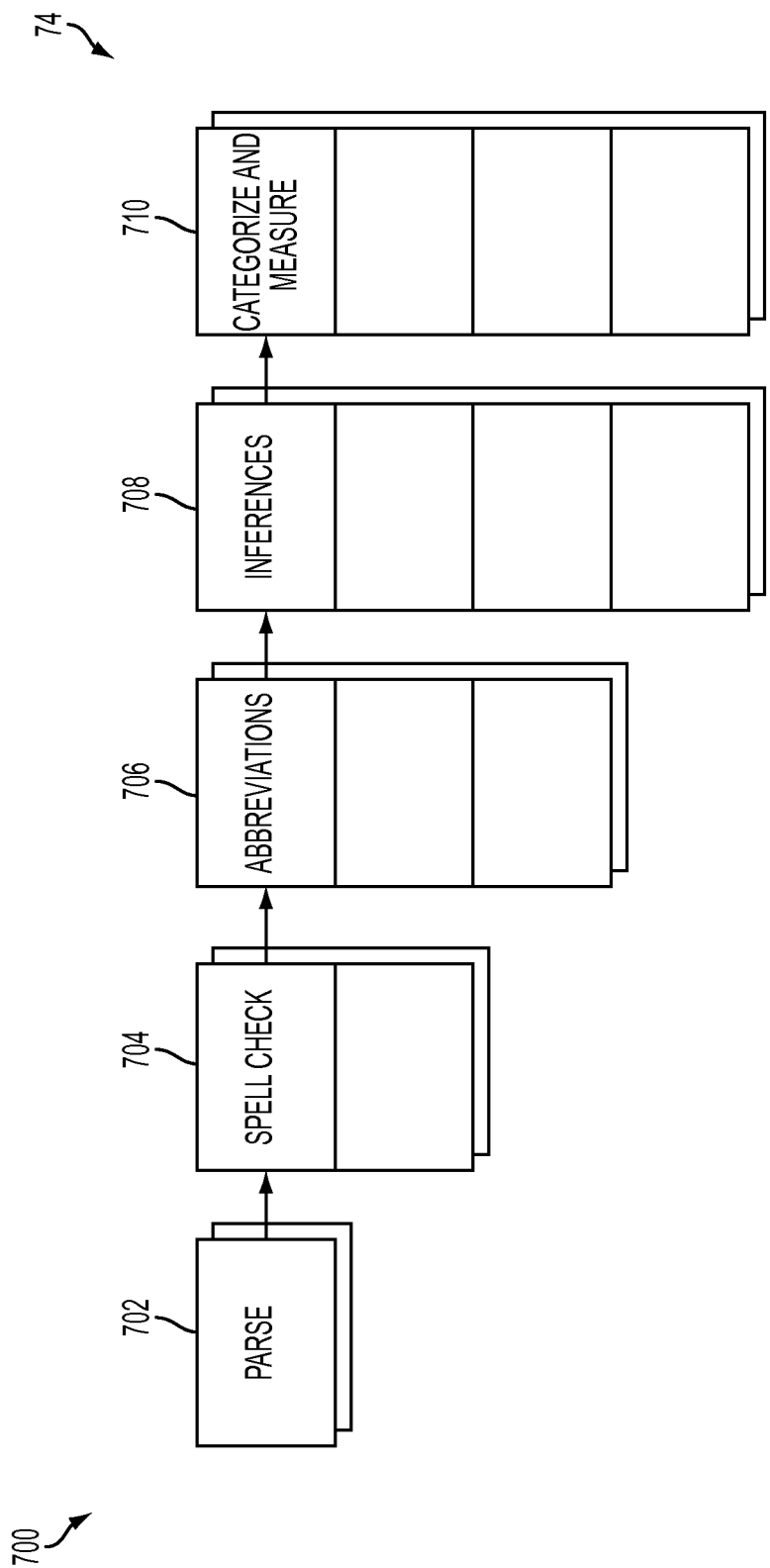
FIG. 7 illustrates an exemplary process for a parsing-and-mapping engine.

FIG. 7 illustrates an exemplary process 700 for a parsing-and-mapping engine 74. In various embodiments, the parsing-and-mapping engine 74 may be similar to the parsing-and-mapping engine 24 of FIG. 2 and the parsing-and-mapping engine 14 of FIG. 1B. In a typical embodiment, the process 700 is operable to transform an input record such as, for example, the input record 22 of FIG. 2 via, for example the HCM language library 38 of FIG. 3. At a parsing step 702, the parsing-and-mapping engine 74 parses raw data such as, for example, an instance of the raw-data data structure 62 of FIG. 6, into linguistic units. In a typical embodiment, steps 704, 706, 708 and 710 proceed individually with respect to each linguistic unit of the linguistic units parsed at the step 702.

At spell-check step 704, the parsing-and-mapping engine 74 may perform a spell check of a linguistic unit from the linguistic units that were parsed at the step 702. At an abbreviation step 706, if the linguistic unit is an abbreviation, the parsing-and-mapping engine 74 attempts to identify one or more meanings for the abbreviation. At an inference step 708, the parsing-and-mapping engine 74 identifies any inferences that may be made either based on the linguistic unit or products of the steps 704 and 706. At step 710, as a cumulative result of steps 702, 704, 706 and 708, the linguistic unit is categorized, for example, into one or more of a plurality of subject dictionaries such as, for example, the plurality of subject dictionaries 358 of FIG. 3. Additionally, a confidence level, or weight, of the linguistic unit may be measured. In that way, the parsing-and-mapping engine 74 is operable to transform the raw data via, for example, the HCM language library 38 of FIG. 3.

Figure 8A:
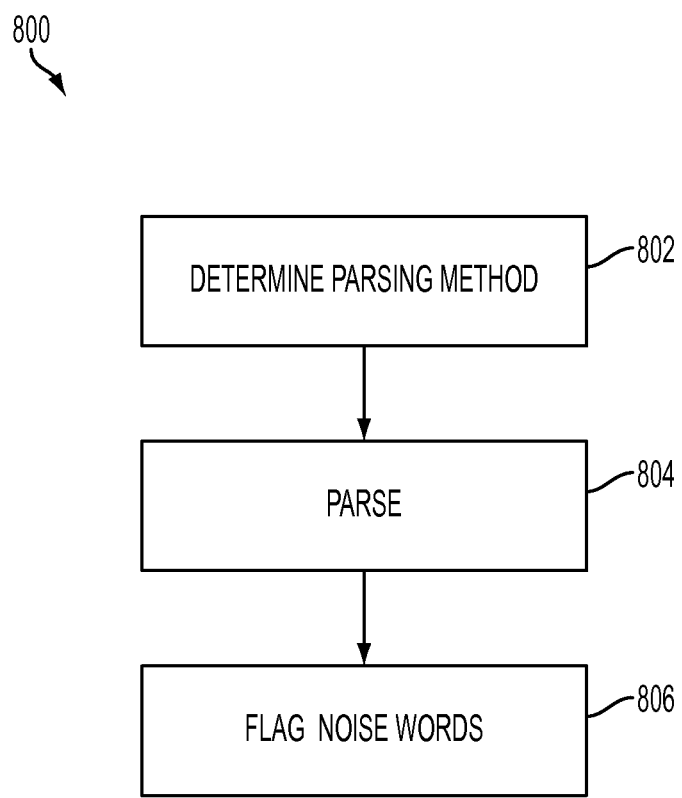
FIG. 8A illustrates an exemplary parsing flow that may be performed by a parsing-and-mapping engine.

FIG. 8A illustrates a parsing flow 800 that may be performed during a parsing step such as, for example, the parsing step 702 of FIG. 7. At step 802, a parsing method is determined. As noted with respect to FIG. 2, an input record such as, for example, the input record 22 of FIG. 2 may be a structured record or an unstructured record. A structured record is a record with pre-defined data elements and known mappings, in this case, to the HCM vector space. Therefore, if an input record such as, for example, the input record 22 of FIG. 2, is a structured record, the known mappings may be followed for purposes of parsing.

However, if an input record such as, for example, the input record 22 of FIG. 2, is an unstructured record, other parsing methods may be utilized such as, for example, template parsing and linguistic parsing. Template parsing may involve receiving data, for example, via a form that conforms to a template. In that way, template parsing may involve identifying linguistic units based on placement of the linguistic units on the form. One of ordinary skill in the art will appreciate that a variety of third-party intelligent data capture (IDC) solutions may be utilized to enable template parsing.

Linguistic parsing may be used to parse an unstructured record when, for example, template parsing is either not feasible or not preferred. In a typical embodiment, linguistic parsing may involve referencing a HCM language library such as, for example, the HCM language library 38 of FIG. 3. Using a HCM language library such as, for example, the HCM language library 38 of FIG. 3, the parsing-and-mapping engine 74 of FIG. 7 may identify each linguistic unit in the unstructured record and determine each linguistic unit's part of speech. One of ordinary skill in the art will recognize that a linguistic unit may be a single word (e.g., "database") or a combination of words that form a logical unit (e.g., "database administrator"). In a typical embodiment, linguistic parsing is tantamount to creating a linguistic diagram of the unstructured record.

At step 804 of FIG. 8A, the parsing-and-mapping engine 74 may parse an input record such as, for example, the input record 22 of FIG. 2, according to the parsing method determined at step 802. In typical embodiment, the step 804 may result in a plurality of parsed linguistic units. At step 806, the parsing-and-mapping engine 74 may flag noise words in the input record using, for example, the HCM language library 38 of FIG. 3. In various embodiments, the flagging of noise words may occur in a manner similar to that described with respect to FIG. 2. After step 806, the parsing flow 800 is complete.

Figure 8B:
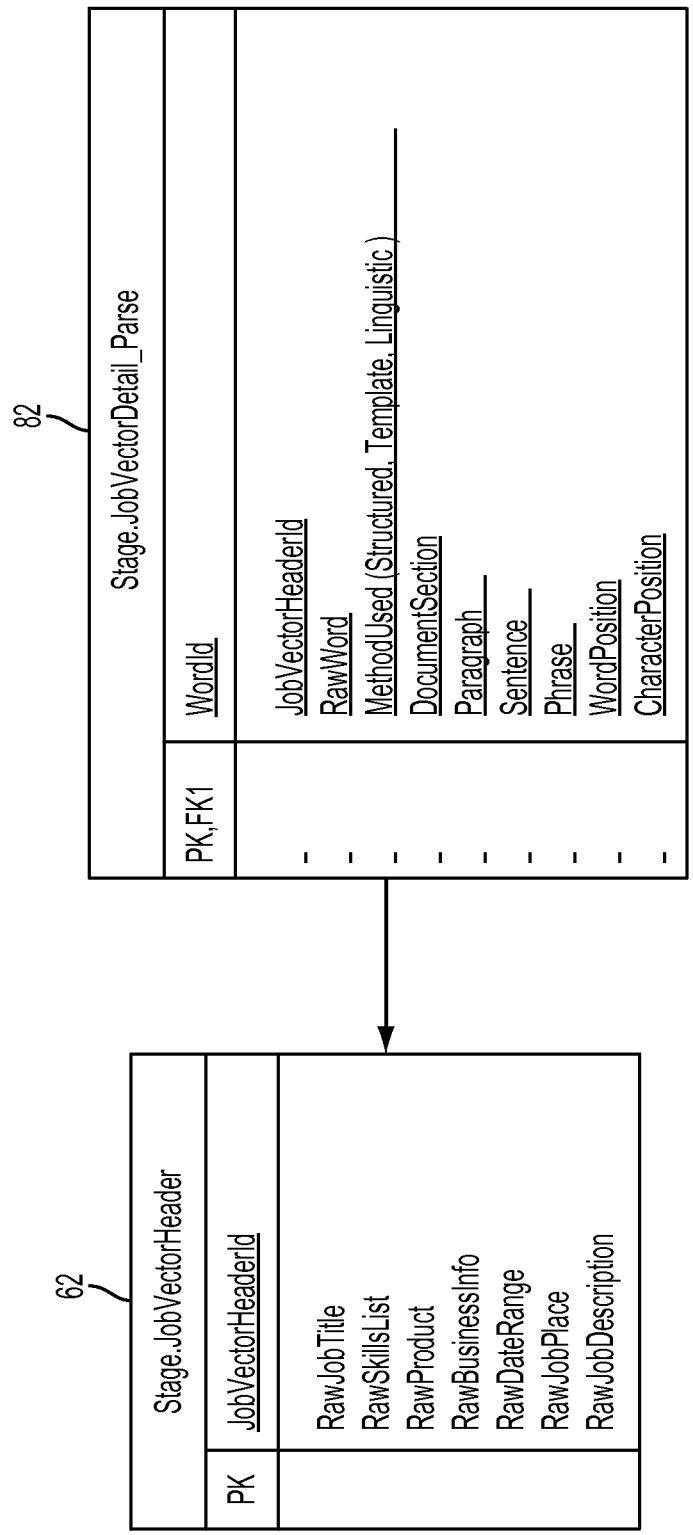
FIG. 8B illustrates an exemplary parsed data record.

FIG. 8B illustrates an exemplary parsed data record 82 that, in various embodiments, may be produced by the parsing flow 800. In a typical embodiment, the parsed data record 82 includes the plurality of parsed linguistic units produced by the parsing flow 800. The plurality of parsed linguistic units may be, for example, words. As shown, in a typical embodiment, the parsed data record 82 may be traced to the raw-data data structure 702 of FIG. 7.

Figure 9:
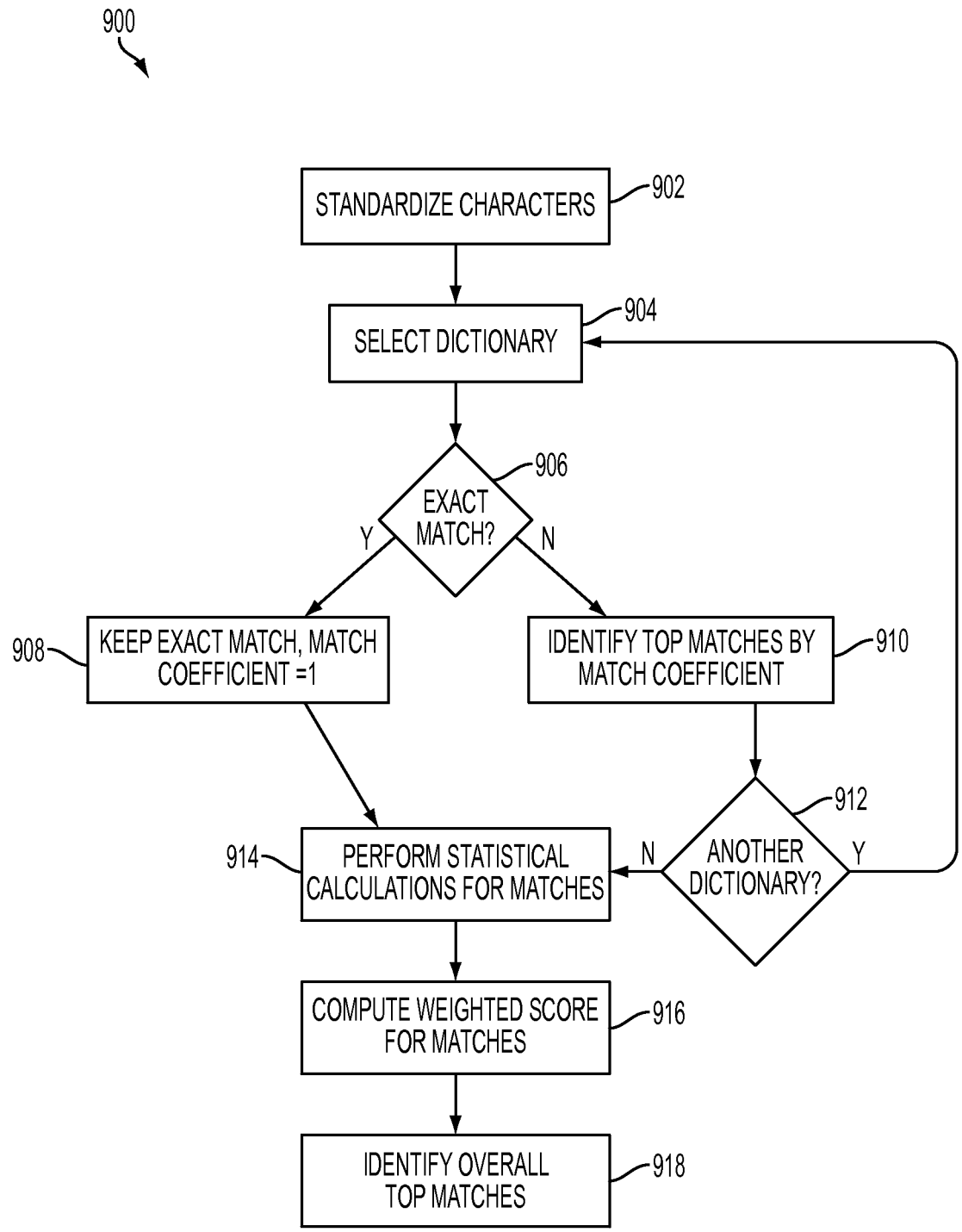
FIG. 9 illustrates a spell-check flow that may be performed by a parsing-and-mapping engine.

FIG. 9 illustrates a spell-check flow 900 that may be performed by the parsing-and-mapping engine 74 during, for example, the spell-check step 704 of FIG. 7. Typically, the spell-check flow 900 begins with a parsed linguistic unit, for example, from the plurality of parsed linguistic units produced by the parsing flow 800 of FIG. 8A. Table 1 includes an exemplary list of spell-check algorithms that may be performed during the step 902, which algorithms will be described in more detail below.

TABLE 1

| SPELL-CHECK ALGORITHM | RESULT |
|---|---|
| Character Standardization | Translates a linguist unit into a standard character set. |
| Exact Match | Returns either 0 or 1. |
| Edit-Distance Ratio | Returns a value between 0 and 1, inclusive. |
| Double-Metaphone Ratio | Returns a value between 0 and 1, inclusive. |

At step 902, the parsing-and-mapping engine 74 may perform a character-standardization algorithm on the parsed linguistic unit. For example, one of ordinary skill in the art will appreciate that an "em dash," an "en dash," a non-breaking hyphen and other symbols are frequently used interchangeably in real-world documents even though each is a distinct symbol. In various embodiments, performing the character-standardization algorithm operates to translate the parsed linguistic unit into a standard character set that removes such ambiguities. In that manner, the efficiency and effectiveness of the spell-check flow 900 may be improved.

At step 904, the parsing-and-mapping engine may select a subject dictionary for searching. In a typical embodiment, the subject dictionary selected for searching may be one of a plurality of subject dictionaries such as, for example, the plurality of subject dictionaries 358 of FIG. 3. In various embodiments, the parsing-and-mapping engine 74 may check the plurality of subject dictionaries 358 of FIG. 3 in a predetermined order as a performance optimization. The performance optimization is typically based on a premise that an exact match in a higher-ranked dictionary is much more significant than an exact match in a lower-ranked dictionary. Therefore, an exact match in a higher-ranked dictionary may eliminate any need to search other dictionaries in the plurality of subject dictionaries 358.

Depending on a particular objective, various orders may be utilized. For example, in some embodiments, the parsing and mapping engine 74 may check the plurality of subject dictionaries 358 in the following order: the job dictionary 358(4), the product dictionary 358(3), the organization dictionary 358(2), the place dictionary 358(1), the calendar dictionary 358(5) and the person dictionary 358(6). In these embodiments, if an exact match for the parsed linguistic unit is found in the job dictionary 358(4), that match is used and no further dictionaries are searched. In that way, computing resources may be preserved.

At step 906, the parsing-and-mapping engine 74 may attempt to identify an exact match for the parsed linguistic unit in the subject dictionary selected for searching at the step 904. In a typical embodiment, the parsing-and-mapping engine 74 of FIG. 7 may perform an exact-match algorithm for the parsed linguistic unit against the subject dictionary selected for searching. In a typical embodiment, the exact-match algorithm returns a one if an exact match for the parsed linguistic unit is found in the dictionary selected for searching and returns a zero otherwise.

If, at the step 906, an exact match is found for the parsed linguistic unit in the subject dictionary selected for searching, in a typical embodiment, the spell-check flow 900 proceeds to step 908. At the step 908, the exact match is kept and no other spell-check algorithm need be performed with respect to that dictionary. Additionally, the exact match may be assigned a match coefficient of one. The match coefficient will be discussed in more detail below. From the step 908, the spell-check flow 900 proceeds directly to step 914.

If the exact-match algorithm returns a zero for the parsed linguistic unit at the step 906, the spell-check flow 900 proceeds to step 910. At the step 910, the parsing-and-mapping engine 74 may identify top matches in the subject dictionary selected for searching via a match coefficient. As used herein, a match coefficient may be considered a metric that serves as a measure of a degree to which a first linguistic unit linguistically matches a second linguistic unit. As part of calculating the match coefficient, an edit-distance-ratio algorithm and a metaphone-ratio algorithm may be performed.

As one of ordinary skill in the art will appreciate, a formula for calculating an edit-distance ratio between a first linguistic unit (i.e., 'A') and a second linguistic unit (i.e., 'B') may be expressed as follows:

Max_Length=Max($A$·Length,$B$·Length)

Edit-Distance Ratio($A$,$B$)=(Max_Length−Edit Distance($A$,$B$))/Max_Length

An edit distance between two linguistic units may be defined as a minimum number of edits necessary to transform the first linguistic unit (i.e., 'A') into the second linguistic unit (i.e., 'B'). A length of the first linguistic unit (i.e., 'A') may be defined as the number of characters contained in the first linguistic unit. Similarly, a length of the second linguistic unit (i.e., 'B') may be defined as the number of characters contained in the second linguistic unit. One of ordinary skill in the art will recognize that the only allowable "edits" for purposes of calculating an edit distance are insertions, deletions or substitutions of a single character. One of ordinary skill in the art will further recognize that the formula for edit-distance ratio expressed above is exemplary in nature and, in various embodiments, may be modified or optimized without departing from the principles of the present invention. In that way, an edit-distance ratio between the parsed linguistic unit and a target linguistic unit in the subject dictionary selected for searching may be similarly calculated.

As one of ordinary skill in the art will appreciate, a formula for calculating a double-metaphone ratio may be expressed as follows:

Double-Metaphone Ratio($A$,$B$)=Edit-Distance Ratio ($A$·Phonetic_Form,$B$·Phonetic_Form)

As one of ordinary skill in the art will appreciate, the double-metaphone ratio algorithm compares a phonetic form for the first linguistic unit (i.e., 'A') and the second linguistic unit (i.e., 'B') and returns a floating number between 0 and 1 that is indicative of a degree to which the first linguistic unit and the second linguistic unit phonetically match. In various embodiments, the double-metaphone ratio algorithm may vary as, for example, as to how A.Phonetic_Form and B.Phonetic_Form are determined and as to how an edit-distance ratio between A.Phonetic_Form and B.Phonetic_Form are calculated. In that way, a double-metaphone ratio between the parsed linguistic unit and a target linguistic unit in the subject dictionary selected for searching may be similarly calculated.

For example, as one of ordinary skill in the art will recognize, the double-metaphone algorithm may determine a primary phonetic form for a linguistic unit and an alternate phonetic form for the linguistic unit. Therefore, in some embodiments, it is possible for both the parsed linguistic unit and a target linguistic unit in the subject dictionary selected for searching to each yield a primary phonetic form and an alternate phonetic form. If the primary phonetic form and the alternate phonetic form for both the parsed linguistic unit and the target linguistic unit in the subject dictionary selected for searching are considered, one of ordinary skill in the art will recognize that four edit-distance ratios may be calculated. In some embodiments, the double-metaphone ratio may be a maximum of the four edit-distance ratios. In other embodiments, the double-metaphone ratio may be an average of the four edit-distance ratios. In still other embodiments the double-metaphone ratio may be a weighted average of the four edit-distance ratios such as, for example, by giving greater weight to ratios between primary phonetic forms.

In some embodiments, greater accuracy for the double-metaphone algorithm may be achieved by further considering a double-metaphone ratio for a backwards form of the parsed linguistic unit. The backwards form of the parsed linguistic unit is, in a typical embodiment, the parsed linguistic unit with its characters reversed. As discussed above, the double-metaphone ratio for the backwards form of the parsed linguistic unit may be considered via, for example, an average or weighted average with the double-metaphone ratio for the parsed linguistic unit in its original form. One of ordinary skill in the art will recognize that any formulas and methodologies for calculating a double-metaphone ratio expressed above are exemplary in nature and, in various embodiments, may be modified or optimized without departing from the principles of the present invention.

Still referring to the step 910 of FIG. 9, in a typical embodiment, an overall edit-distance ratio and an overall double-metaphone ratio may be calculated using, for example, one or more methodologies discussed above. Using the double-metaphone ratio and the edit-distance ratio, a match coefficient may be calculated, for example, as follows:

Match Coefficient($A$,$B$)=(Exact-Match($A$,$B$)+Edit-Distance Ratio($A$,$B$)+Double-Metaphone Ratio ($A$,$B$))/3

As one of ordinary skill in the art will recognize, by virtue of reaching the step 910, no exact match for the raw linguistic typically exists in the dictionary selected for searching. Therefore, "Exact-Match (A, B)" will generally be zero.

In various embodiments, a result of the step 910 is that the parsing-and-mapping engine 74 identifies the top matches, by match coefficient, in the subject dictionary selected for searching. In a typical embodiment, any matches that have a match coefficient that is less than a dictionary coefficient for the subject dictionary selected for searching may be removed from the top matches. The dictionary coefficient, in a typical embodiment, is a metric representing an average edit distance between any two nearest neighbors in a dictionary. For example, a formula for the dictionary coefficient may be expressed as follows:

Dictionary Coefficient=($\frac{1}{2}$)+(Average_Edit_Distance (Dictionary)/2)

In this manner, in terms of edit distance, it may be ensured that the top matches match the parsed linguistic unit at least as well as any two neighboring linguistic units in the subject dictionary selected for searching, on average, match each other.

In a typical embodiment, after the step 910, the spell-check flow 900 proceeds to step 912. At the step 912, the parsing-and-mapping engine 74 may determine whether, for example, others of the plurality of subject dictionaries 358 of FIG. 3 should be searched according to the predetermined order discussed above. If so, the spell-check flow 900 returns to the step 904 for selection of another subject dictionary according to the predetermined order. Otherwise, the spell-check flow 900 proceeds to step 914.

At the step 914, the parsing-and-mapping engine 74 may perform statistical calculations on a set of all top matches identified across, for example, the plurality of subject dictionaries 358 of FIG. 3. As will be apparent from discussions above, the set of all top matches may include, in a typical embodiment, exact matches and matches for which a match coefficient is greater-than-or-equal-to an applicable dictionary coefficient. Table 2 describes a plurality of frequency metrics that may be calculated according to a typical embodiment.

TABLE 2

| FREQUENCY METRIC | DESCRIPTION |
| --- | --- |
| Local Frequency | Number of occurrences of a particular linguistic unit from a particular subject dictionary in a set of master data. |
| Max Frequency | Maximum of all local frequencies |
| Total Frequency | Sum of all local frequencies |

In a typical embodiment, a local frequency may be calculated for each top match of the set of all top matches. As mentioned above with respect to FIG. 3, in a typical embodiment, the HCM language library 38 of FIG. 3 may be configured and pre-calibrated, via HCM subject-matter expertise, to the set of HCM master data. Therefore, in various embodiments, the local frequency may represent a total number of occurrences of a particular top match from the set of all top matches in a corresponding subject dictionary from the plurality of subject dictionaries 358 of FIG. 3. In a typical embodiment, the local frequency may already be stored in the corresponding subject dictionary. Therefore, a max frequency may be identified by determining which top match from the set of all top matches has the largest local frequency. A total frequency may be calculated by totaling local frequencies for each top match of the set of all top matches.

From the step 914, the spell-check flow 900 proceeds to step 916. At the step 916, the parsing-and-mapping engine 74 may compute a weighted score for each top match in the set of all top matches. In various embodiments, the weighted score may be calculated as follows:

$$\text{Weighted Score} = \text{Match Coefficient} * \text{Local\_Frequency} / \text{Total Frequency}$$

One of ordinary skill in the art will note that the weighted score yields a value between 0 and 1. In that way, the parsing-and-mapping engine may weight a particular top match's match coefficient based on a frequency of that top match relative to frequencies of other top matches.

From step 916, the spell-check flow 900 proceeds to step 918. At the step 918, the parsing-and-mapping engine 74 may identify overall top matches in the set of all top matches. In a typical embodiment, the overall top matches in the set of all top matches are those matches that meet one or more predetermined statistical criteria. An exemplary pre-determined statistical criterion is as follows:

$$\text{Local Frequency} >= \text{Max\_Frequency} - (3 * \text{Standard\_Deviation}(\text{Local\_Frequencies}))$$

Thus, in some embodiments, the overall top matches may include each top match in the set of all top matches for which the local frequency meets the exemplary pre-determined statistical criterion. After the step 918, the spell-check flow 900 ends. In a typical embodiment, the process 900 may be performed for each of the plurality of parsed linguistic units produced by the parsing flow 800 of FIG. 8A.

Figure 10:
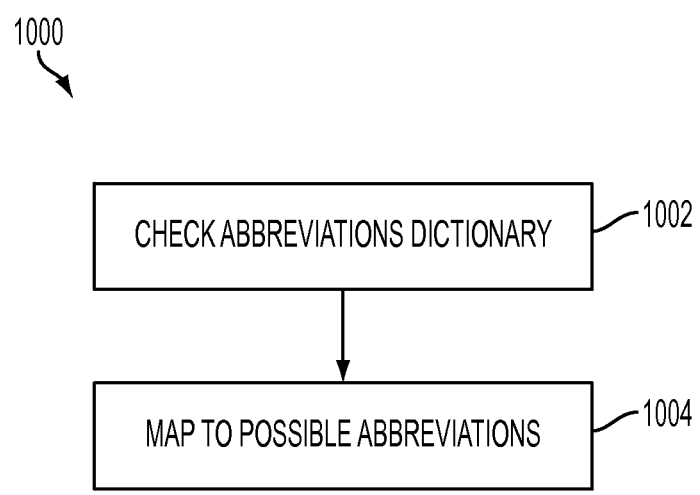
FIG. 10 illustrates an abbreviation flow that may be performed by a parsing-and-mapping engine.

FIG. 10 illustrates an abbreviation flow 1000 that may be performed by the parsing-and-mapping engine 74 during, for example, the abbreviation step 706 of FIG. 7. It should be noted that, in a typical embodiment, if it can be determined that none of the overall total matches from the spell-check flow 900 and the parsed linguistic unit are abbreviations, then the process 1000 need not be performed. This may be determined, for example, by referencing the HCM master dictionary of FIG. 3 and a part-of-speech identified, for example, during the parsing flow 800 of FIG. 8B. At step 1002, the parsing-and-mapping engine 74 may check an abbreviation dictionary such as, for example, the abbreviation dictionary 362 of FIG. 3. In a typical embodiment, the abbreviation dictionary may be checked with respect to each parsed linguistic unit in the plurality of parsed linguistic units produced by the parsing flow 800 of FIG. 8A and each of the overall top matches from the spell-check flow 900.

At step 1004, the parsed linguistic unit and each of the overall top matches are mapped to any possible abbreviations listed, for example, in the abbreviation dictionary 362 of FIG. 3. One of ordinary skill in the art will recognize that the abbreviation dictionary 362, in a typical embodiment, may yield possible abbreviations, for example, across the plurality of subject dictionaries 358 of FIG. 3. In a typical embodiment, a weighted score for each of the possible abbreviations may be obtained, for example, from the abbreviation dictionary 362. Following the step 1004, the abbreviation flow 1000 ends.

Figure 11A:
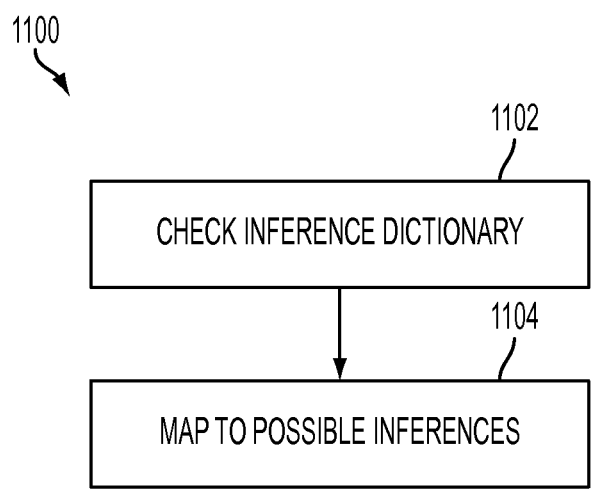
FIG. 11A illustrates an inference flow that may be performed by a parsing-and-mapping engine.

FIG. 11A illustrates an inference flow 1100 that may be performed by the parsing-and-mapping engine 74 during, for example, the inference step 708 of FIG. 7. At step 1102, the parsing-and-mapping engine 74 may check an inference dictionary such as, for example, the inference dictionary 360 of FIG. 3. In various embodiments, with respect to a parsed linguistic unit in the plurality of parsed linguistic units from the parsing flow 800 of FIG. 8A, the parsed linguistic unit, the overall top matches from the spell-check flow 900 of FIG. 9 and the possible abbreviations from the abbreviation flow 1000 of FIG. 10 are all checked in the inference dictionary 360 of FIG. 3. To facilitate the discussion of the inference flow 1100, the parsed linguistic unit, the overall top matches from the spell-check flow 900 of FIG. 9 and the possible abbreviations from the abbreviation flow 1000 of FIG. 10 will be collectively referenced as source linguistic units. Table 3 lists exemplary relationships that may be included in the inference dictionary 360 of FIG. 3. Other types of relationships are also possible and will be apparent to one of ordinary skill in the art.

TABLE 3

| RELATIONSHIP | RANKING |
| --- | --- |
| "IS-A" Relationship | Rank = 1 |
| Synonym | Rank = 1 |
| Frequency-Based Relationship | Rank from 1 to n based on frequency |

As shown in Table 3, the inference dictionary 360 of FIG. 3 may yield, for example, "IS-A" relationships, synonyms and frequency-based relationships. In a typical embodiment, an "IS-A" relationship is a relationship that infers a more generic linguistic unit from a more specific linguistic unit. For example, a linguistic unit of "milk" may have an "IS-A" relationship with "dairy product" since milk is a dairy product. "IS-A" relationships may be applied in a similar manner in the HCM subject-matter domain. In a typical embodiment, a synonym relationship is a relationship based on one linguistic unit being synonymous, in at least one context, with another linguistic unit. A frequency-based relationship is a relationship based on two linguistic units being "frequently" related, typically in a situation where no other relationship can be clearly stated. With a frequency-based relationship, the inference dictionary 360 typically lists a frequency for the relationship, for example, from the set of master data for the HCM language library 38 of FIG. 3. In a typical embodiment, the inference dictionary 360 of FIG. 3 may list one or more relationships for each of the source linguistic units.

At step 1104, each of the source linguistic units are mapped to any possible inferences, or inferred linguistic units, from the inference dictionary 360. In a typical embodiment, "IS-A" relationships and synonym relationships are each given a rank of one. Additionally, in a typical embodiment, frequency-based relationships are ranked from one to n based on, for example, a frequency number provided in the inference dictionary 360. The inferred linguistic units are, in a typical embodiment, retained and stored with the source linguistic units, that is, the parsed linguistic unit, the overall top matches from the spell-check flow 900 of FIG. 9 and the possible abbreviations from the abbreviation flow 1000 of FIG. 10. After the step 1104, the inference flow 1100 ends.

Figure 11B:
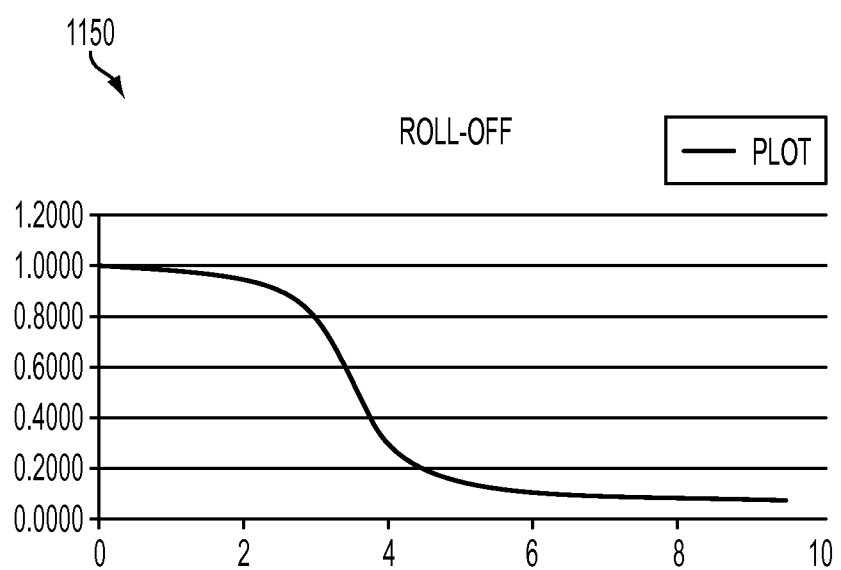
FIG. 11B illustrates a graph that may utilized in various embodiments.

FIG. 11B illustrates a graph 1150 that may utilized in various embodiments. One of ordinary skill in the art will recognize that the graph 1150 is a Cauchy distribution. In a typical embodiment, the graph 1150 may be utilized to convert, for example, a rank on the x-axis to a weighted score between zero and one on the y-axis. For example, the graph 1150 may be utilized to convert and store a rank associated with each of the inferred linguistic units produced in the process 1100 of FIG. 11A into a weighted score. One of ordinary skill in the art will appreciate that, in various embodiments, other distributions may be used in place of the Cauchy distribution.

Figure 12:
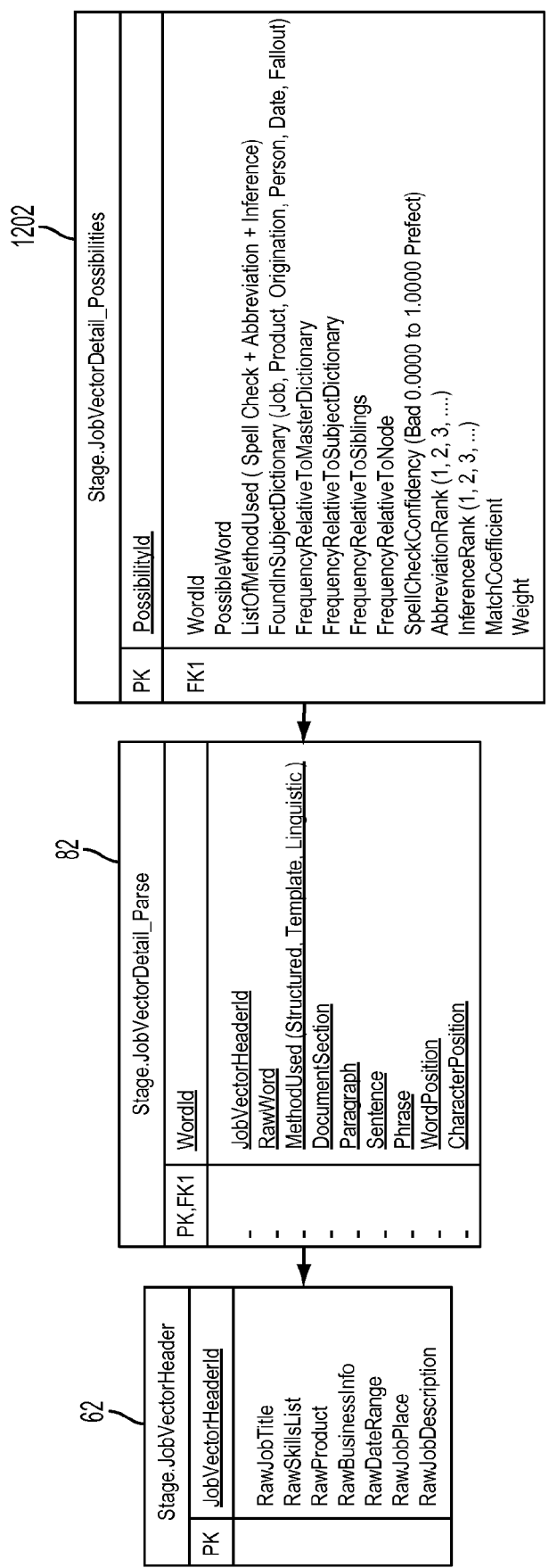
FIG. 12 illustrates an exemplary multidimensional vector.

FIG. 12 illustrates an exemplary multidimensional vector 1202 that may, in various embodiments, be produced as a result of the parsing flow 800, the spell-check flow 900, the abbreviation flow 1000 and the inference flow 1100. In various embodiments, the multidimensional vector 1202 may be similar to the multidimensional vector 206 of FIG. 2. As shown, in a typical embodiment, the multidimensional vector 1202 may be traced to the raw-data data structure 702 of FIG. 7 and the parsed data record 82 of FIG. 8B.

In various embodiments, the multidimensional vector 1202 represents a projection of the plurality of parsed linguistic units produced in the parsing flow 800 of FIG. 8A onto the HCM vector space. The multidimensional vector 1202 generally includes the plurality of parsed linguistic units produced in the parsing flow 800 of FIG. 8A. The multidimensional vector also generally includes, for each parsed linguistic unit in the plurality of parsed linguistic units: each of the overall top matches from the spell-check flow 900 of FIG. 9, each of the possible abbreviations from the abbreviation flow 1000 of FIG. 10 and each of the inferred linguistic units from the inference flow 1100 as dimensions of the multidimensional vector 1202. Each dimension of the multidimensional vector 1202 is thus a vector that has direction and magnitude (e.g., weight) relative to the HCM vector space. More particularly, each dimension of the multidimensional vector 1202 typically corresponds to a subject dictionary, for example, from the plurality of subject dictionaries 358. In a typical embodiment, each dimension of the multidimensional vector 1202 thereby provides a probabilistic assessment as to one or more meanings of the plurality of parsed linguistic units in the HCM subject-matter domain. In that way, each dimension of the multidimensional vector 1202 may reflect one or more possible meanings of the plurality of parsed linguistic units and a level of confidence, or weight, in those possible meanings.

Figure 13:
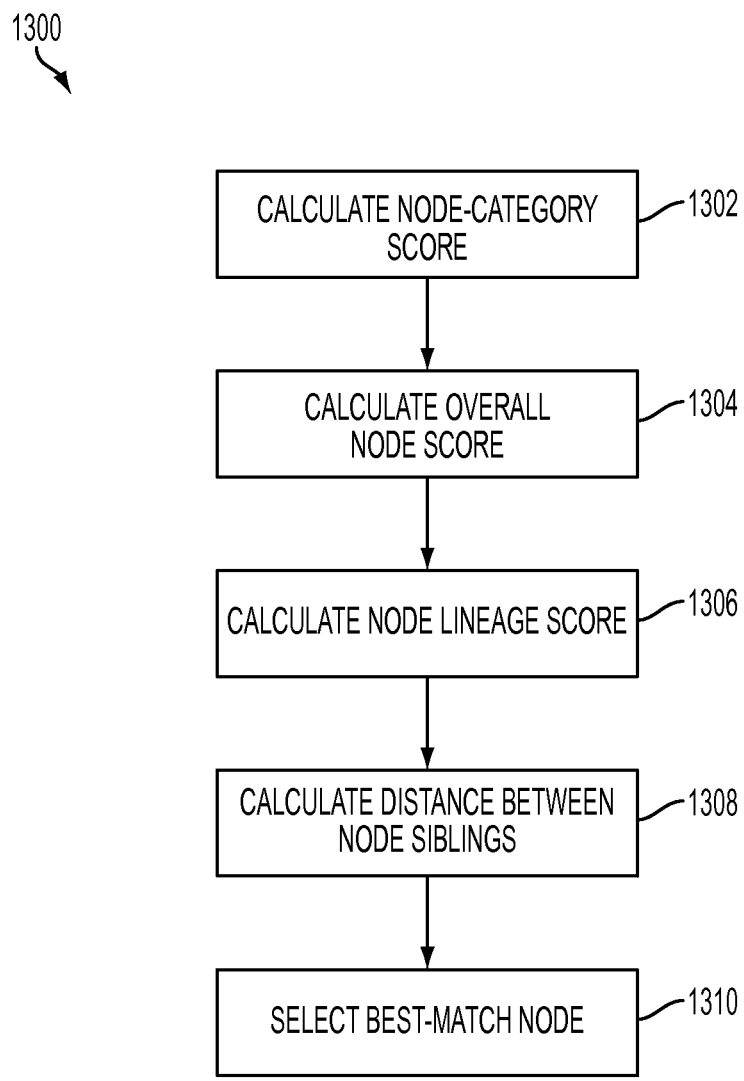
FIG. 13 illustrates an exemplary process that may be performed by a similarity-and-relevancy engine.

FIG. 13 illustrates an exemplary process 1300 that may be performed by a similarity-and-relevancy engine 1326. In various embodiments, the similarity-and-relevancy engine 1326 may be similar to the similarity-and-relevancy engine 26 of FIG. 2 and the similarity-and-relevancy engine 16 of FIG. 1B. At step 1302, subject to various performance optimizations that may be implemented, a node-category score may be calculated for each of a plurality of subject dictionaries, for each node of a HCM master taxonomy between a domain level and a family level and across the plurality of parsed linguistic units produced, for example, by the parsing flow 800 of FIG. 8A. In various embodiments, the plurality of subject dictionaries may be, for example, the plurality of subject dictionaries 358 of FIG. 3 and the HCM master taxonomy may be, for example, the HCM master taxonomy 418 of FIG. 4. Further, in a typical embodiment, the node-category score may be calculated for each node of the HCM master taxonomy 418 beginning at the job-domain level 420 through the job-family level 428.

In a typical embodiment, each of the overall top matches from the spell-check flow 900 of FIG. 9, each of the possible abbreviations from the abbreviation flow 1000 of FIG. 10 and each of the inferred linguistic units from the inference flow 1100 may represent a possible meaning of a particular parsed linguistic unit. Further, as noted above, each such possible meaning typically has a weighted score indicating a degree of confidence in the possible meaning In a typical embodiment, calculating the node-category score at the step 1302 may involve, first, identifying a highest-weighted possible meaning at a dimension of the multidimensional vector for a particular one of the parsed linguistic units. The highest-weighted possible meaning is generally a possible meaning with the highest weighted score.

Typically, the highest-weighted possible meaning is identified for each parsed linguistic unit in the plurality of parsed linguistic units produced in the parsing flow 800 of FIG. 8A. In a typical embodiment, the node-category score involves summing the weighted scores for the highest-weighted possible meaning for each of the plurality of parsed linguistic units produced in the parsing flow 800 of FIG. 8A. In that way, a node-category score may be calculated, for example, for a particular dimension of the multidimensional vector 1202 of FIG. 12. In a typical embodiment, the step 1302 may be repeated for each dimension of the multidimensional vector 1202 of FIG. 12. In various embodiments, following the step 1302, a node-category score is obtained for each node of the HCM master taxonomy 418 from the job-domain level 420 through the job-family level 428.

Various performance optimizations may be possible with respect to the step 1302. For example, one of ordinary skill in the art will recognize that a master taxonomy such as, for example, the HCM master taxonomy 418 may conceivably include thousands or millions of nodes. Therefore, in various embodiments, it is beneficial to reduce a number of nodes for which a node-category score must be calculated. In some embodiments, the number of nodes for which the node-category score must be calculated may be reduced by creating a stop condition when, for example, a node-category score is zero. In these embodiments, all nodes beneath a node having a node-category score of zero may be ignored under an assumption that the node-category score for these nodes is also zero.

For example, if a node-category score of zero is obtained for a node at the job-domain level 420, all nodes beneath that node in the HCM master taxonomy 418, in a typical embodiment, may be ignored and assumed to similarly have a node-category score of zero. In various embodiments, this optimization is particularly effective, for example, at domain, category and subcategory levels of a master taxonomy such as, for example, the master taxonomy 418. Additionally, in various embodiments, utilization of this optimization may result in faster and more efficient operation of a similarity-and-relevancy engine such as, for example, the similarity- and relevancy engine 1326. One of ordinary skill in the art will recognize that other stop conditions are also possible and are fully contemplated as falling within the scope of the present invention.

In various embodiments, performance of the step 1302 may also be optimized through utilization of bit flags. For example, in a typical embodiment, a node in the HCM master taxonomy 418, hereinafter a flagged node, may have a bit flag associated with a node attribute for the flagged node. In a typical embodiment, the bit flag may provide certain information regarding whether the associated node attribute may also be a node attribute for the flagged node's siblings. As one of ordinary skill in the art will appreciate, all nodes that immediately depend from the same parent may be considered siblings. For example, with respect to the HCM master taxonomy 418 of FIG. 4, all nodes at the job-family level 438 that immediately depend from a single node at the job-family level 428 may be considered siblings.

In a typical embodiment, the bit flag may specify: (1) an action that is taken if a particular condition is satisfied; and/or (2) an action that is taken if a particular condition is not satisfied. For example, in various embodiments, the bit flag may specify: (1) an action that is taken if the associated node attribute matches, for example, a dimension of the multidimensional vector 1202 of FIG. 12; and/or (2) an action that is taken if the associated node attribute does not match, for example, a dimension of the multidimensional vector 1202 of FIG. 12. Table 4 provides a list of exemplary bit flags and various actions that may be taken based thereon. One of ordinary skill in the art will recognize that other types of bit flags and actions are also possible.

relevancy engine 1326 may take the action specified in Table 4 under "Action if Vector Matches Attribute." Otherwise, no action is taken. In this manner, the similarity-and-relevancy engine 1326 may proceed more quickly and more efficiently.

In a typical embodiment, the attribute-must-exist flag indicates that, in order for the flagged node or any of the flagged node's siblings to be considered to match a dimension of a multidimensional vector such as, for example, the multidimensional vector 1202 of FIG. 12, the associated attribute must independently match the dimension of the multidimensional vector. If the associated attribute does not independently match the dimension of the multidimensional vector, the similarity-and-relevancy engine 1326 may skip the flagged node's siblings for purposes of calculating a node-category score as part of the step 1302 of FIG. 13. Rather, the similarity-and-relevancy engine 1326 may take the action specified in Table 4 under "Action if Vector Does Not Match Node Attribute." Otherwise, the similarity-and-relevancy engine 1326 may take the action specified in Table 4 under "Action if Vector Matches Attribute." In this manner, the similarity-and-relevancy engine 1326 may proceed more quickly and more efficiently.

In a typical embodiment, the attribute-can-exist bit flag indicates that the associated node attribute may exist but provides no definitive guidance as to the flagged node's siblings. According to the attribute-can-exist flag, if the associated node attribute matches, for example, a dimension of the multidimensional vector 1202 of FIG. 12, the similarity-and-relevancy engine 1326 may take the action specified in Table 4 under "Action if Vector Matches Attribute." Otherwise, no action is taken.

TABLE 4

| BIT FLAG | ACTION IF VECTOR MATCHES ATTRIBUTE | ACTION IF VECTOR DOES NOT MATCH ATTRIBUTE |
| --- | --- | --- |
| Attribute Only Exists | For flagged node, add weighted score to the node-category score; for all siblings, node-category score = 0. | No action. |
| Attribute Must Exist | For flagged node, add weighted score to the node-category score; for siblings, no action. | For flagged node, node-category score = 0; for all siblings, node-category score = 0. |
| Attribute Can Exist | For flagged node, add weighted score to the node-category score; for siblings, no action. | No action. |
| Attribute Must Not Exist | For flagged node, node-category score = 0; for all siblings, node-category score = 0. | No action. |

For example, as shown in Table 4, in a typical embodiment, the similarity-and-relevancy engine 1326 may utilize an attribute-only-exists bit flag, an attribute-must-exist bit flag, an attribute-can-exist bit flag and an attribute-must-not-exist bit flag. In some embodiments, every node in a master taxonomy such as, for example, the HCM master taxonomy 418 may have bit flag associated with each node attribute. In these embodiments, the bit flag may be one of the four bit flags specified in Table 4.

In a typical embodiment, the attribute-only-exist bit flag indicates that, among the flagged node and the flagged node's siblings, only the flagged node has the associated attribute. Therefore, according to the attribute-only-exist bit flag, if the associated node attribute matches, for example, a dimension of the multidimensional vector 1202 of FIG. 12, the similarity-and-relevancy engine 1326 may skip the flagged node's siblings for purposes of calculating a node-category score as part of the step 1302 of FIG. 13. Rather, the similarity-and- In a typical embodiment, the attribute-must-not-exist bit flag indicates that neither the flagged node nor the flagged node's siblings have the associated node attribute. Therefore, according to the attribute-must-not-exist bit flag, if the associated node attribute matches, for example, a dimension of the multidimensional vector 1202 of FIG. 12, the similarity-and-relevancy engine 1326 may skip the flagged node's siblings for purposes of calculating a node-category score as part of the step 1302 of FIG. 13. Rather, the similarity-and-relevancy engine 1326 may take the action specified in Table 4 under "Action if Vector Matches Attribute." Otherwise, no action is taken. In this manner, the similarity-and-relevancy engine 1326 may proceed more quickly and more efficiently.

Following the step 1302, the process 1300 proceeds to step 1304. At the step 1304, an overall node score may be calculated for each node of the HCM master taxonomy 418 of FIG. 4 from the job-domain level 420 through the job-family level 428. In a typical embodiment, the overall node score may be calculated, for example, by performing the following calculation for a particular node:

$$\text{Overall\_Node\_Score} = \text{Square-Root}((C^*S_1)^2 + (C^*S_2)^2 + \ldots + (C^*S_n)^2)$$

In the formula above, C represents a category weight, $S_1$ and $S_2$ each represent a node-category score and 'n' represents a total number of node-category scores for the particular node. In a typical embodiment, a category weight is a constant factor that may be used to provide more weight to node-category weights for certain dimensions of the multidimensional vector 1202 of FIG. 12 than others. Table 5 provides a list of exemplary category weights that may be utilized in various embodiments.

TABLE 5

| SUBJECT | WEIGHT |
|---|---|
| Job | 1 |
| Product | 0.86 |
| Organization | 0.66 |
| Person | 0.32 |
| Place | 0.20 |
| Date | 0.11 |

From the step 1304, the process 1300 proceeds to step 1306. At the step 1306, the similarity-and-relevancy engine 1326 may calculate a node lineage score for each node at a particular level, for example, of the HCM master taxonomy 418 of FIG. 4. In a typical embodiment, the node lineage score is initially calculated for each node at the job-family level 428 of the HCM master taxonomy 418 of FIG. 4. In a typical embodiment, a maximum node lineage score may be identified and utilized in subsequent steps of the process 1300. For example, a node lineage score may be expressed as follows:

$$\text{Node\_Lineage\_Score}_{Node} = \text{Square-Root}((\text{Node\_Level\_Weight}_{Node}^* \text{Overall\_Node\_Score}_{Node})^2 + \ldots + (\text{Node\_Level\_Weight}_{Domain}^* \text{Overall\_Node\_Score}_{Domain})^2)$$

As part of the formula above, calculating the node lineage score for a particular node (i.e., $\text{Node\_Lineage\_Score}_{Node}$) may involve calculating a product of a node-level weight for the particular node (i.e., $\text{Node\_Level\_Weight}_{Node}$) and an overall node score for the particular node (i.e., $\text{Overall\_Node\_Score}_{Node}$). Typically, as shown in the formula above, a product is similarly calculated for each parent of the particular node up to a domain level such as, for example, the job-domain level 420. Therefore, a plurality of products will result. In a typical embodiment, as indicated in the formula above, each of the plurality of products may be squared and subsequently summed to yield a total. Finally, in the formula above, a square-root of the total may be taken in order to obtain the node lineage score for the node (i.e., $\text{Node\_Lineage\_Score}_{Node}$).

In various embodiments, as indicated in the exemplary formula above, the node lineage score may utilize a node-level weight. The node-level weight, in a typical embodiment, is a constant factor that may be used to express a preference for overall node scores of nodes that are deeper, for example, in, the HCM master taxonomy 418. For example, Table 6 lists various exemplary node-level weights that may be used to express this preference. One of ordinary skill in the art will recognize that other node-level weights may also be utilized without departing from the principles of the present invention.

TABLE 6

| NODE LEVEL | WEIGHT |
|---|---|
| Domain | 1 |
| Category | 2 |
| Sub-Category | 3 |
| Class | 4 |
| Family | 5 |

From the step 1306, the process 1300 proceeds to step 1308. At the step 1308, the similarity-and-relevancy engine 1326 may calculate a distance between the maximum node-lineage score identified at the step 1306 and each sibling of a node having the maximum node-lineage score. For simplicity of description, the node having the maximum node-lineage score will be referenced as a candidate node and a sibling of the candidate node will be referenced as a sibling node. In various embodiments, an objective of the step 1306 is to use the distance between the candidate node and each sibling node to help ensure that the candidate node more closely matches, for example, the multidimensional vector 1202 of FIG. 12 than it does any sibling node. In other words, the step 1306 may provide a way to ensure a certain level confidence in the candidate node.

In a typical embodiment, for a particular sibling node, the step 1308 generally involves processing node attributes of the particular sibling node as a first hypothetical input into the similarity-and-matching engine 1326 solely with respect to the candidate node. In other words, the step 1302, the step 1304 and the 1306 may be performed with the hypothetical input in such a manner that ignores all nodes except for the candidate node. The first hypothetical input, in a typical embodiment, yields a first hypothetical node-lineage score that is based on a degree of match between the node attributes of the sibling node and the candidate node.

Similarly, in a typical embodiment, the step 1308 further involves processing node attributes of the candidate node as a second hypothetical input into the similarity-and-matching engine 1326 solely with respect to the candidate node. In other words, the step 1302, the step 1304 and the 1306 may be performed with the second hypothetical input in such a manner that ignores all nodes except for the candidate node. The second hypothetical input, in a typical embodiment, yields a second hypothetical node-lineage score based on a degree of match between the node attributes of the candidate node and the candidate node.

Therefore, in various embodiments, a distance between the candidate node and the particular sibling node may be considered to be the first hypothetical node-lineage score divided by the second hypothetical node-lineage score. Similarly, in various embodiments, a distance between, for example, the multidimensional vector 1202 of FIG. 12 and the candidate node may be considered to be the maximum node-lineage score divided by the second hypothetical node-lineage score. In a typical embodiment, the calculations described above with respect to the particular sibling node may be performed for each sibling node of the candidate node.

From the step 1308, the process 1300 proceeds to step 1310. At the step 1310, a best-match node, for example, for the multidimensional vector 1202 of FIG. 12 may be selected. In a typical embodiment, the candidate node must meet at least one pre-defined criterion in order to be deemed the best-match node. For example, in a typical embodiment, for each sibling node of the candidate node, the distance between the multidimensional vector 1202 of FIG. 12 and the candidate node must be less than the distance between the candidate node and the sibling node. In a typical embodiment, if the at least one pre-defined criterion is not met, the step 1306, the step 1308 and the step 1310 may be repeated one level higher, for example, in the HCM master taxonomy 418 of FIG. 4. For example, if the best-match node cannot be identified at the job-family level 428, the step 1306, the step 1308 and the step 1310 may proceed with respect to the job-class level 426. In a typical embodiment, the HCM master taxonomy 418 is optimized so that, in almost all cases, the best-match node may be identified at the job-family level 428. Therefore, in a typical embodiment, the step 1310 yields a collection of similar species at the job-species level 438, species in the collection of similar species having the best-match node as a parent. Following the step 1310, the process 1300 ends.

Figure 14:
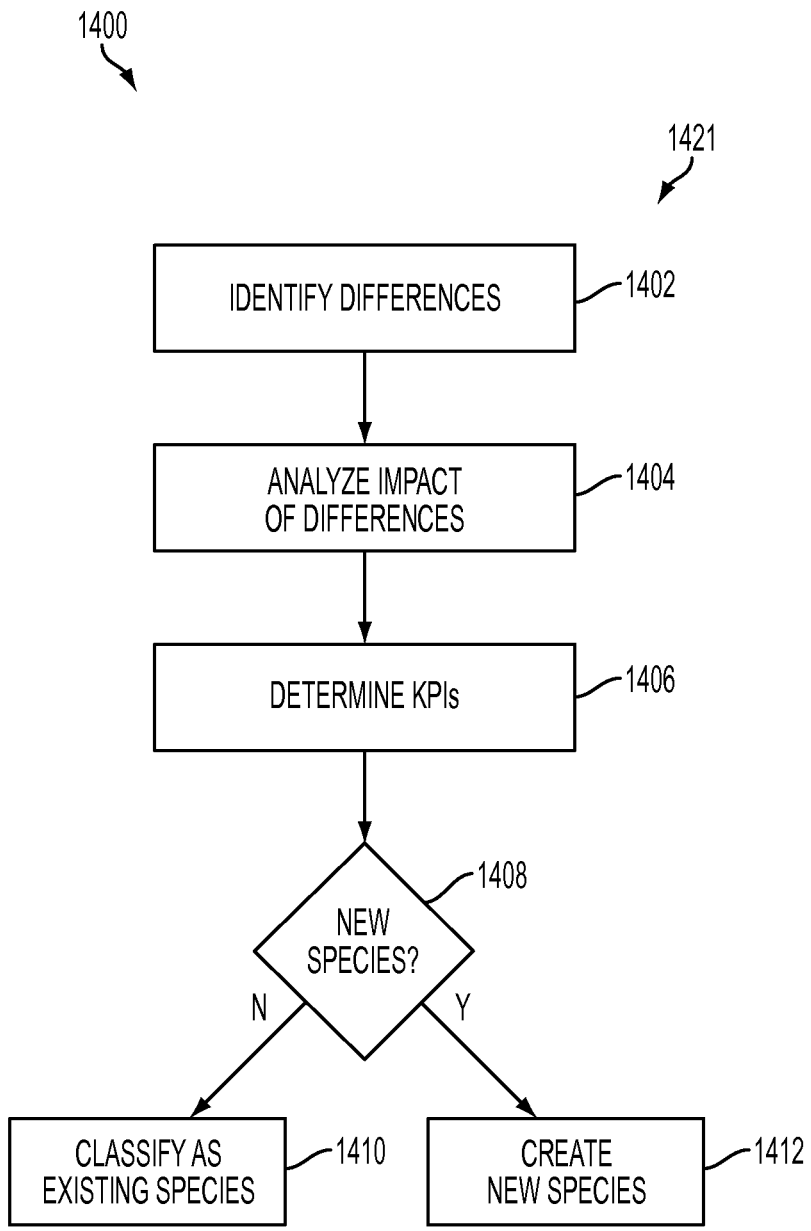
FIG. 14 illustrates an exemplary process that may be performed by an attribute-differential engine.

FIG. 14 illustrates an exemplary process 1400 that may be performed by an attribute-differential engine 1421. In various embodiments, the attribute-differential engine 1421 may be similar to the attribute-differential engine 21 of FIG. 2. At step 1402, the attribute-differential engine 1421 may identify differences between node attributes for each species of the collection of similar species produced by the process 1300 of FIG. 13. Identified differences may be similar, for example, to the modifying attributes 252 of FIG. 2. From step 1402, the process 1400 proceeds to step 1404. At the step 1404, an impact of the identified differences may be analyzed relative to a spotlight attribute such as, for example, a pay rate for a human resource. In a typical embodiment, the attribute-differential engine 1421 may statistically measure the impact in the HCM vector space based on, for example, the HCM language library 38. From the step 1404, the process 1400 proceeds to step 1406.

At the step 1406, a set of KPIs may be determined. In a typical embodiment, the set of KPIs may be similar to the set of KPIs 254 of FIG. 2. In a typical embodiment, the set of KPIs may be represent ones of the identified differences that statistically drive, for example, the pay rate for a human resource. From step 1406, the process 1400 proceeds to step 1408.

At the step 1408, the attribute-differential engine 1421 is operable to determine whether, for example, the multidimensional vector 1202 of FIG. 2 may be considered a new species or an existing species (i.e., a species from the collection of similar species). If the multidimensional vector 1202 is determined, based on the set of KPIs, to be an existing species for a particular species in the collection of similar species, the multidimensional vector 1202 may be so classified at step 1410. In that case, the multidimensional vector 1202 may be considered to have, for example, a same pay rate as the particular species. Following the step 1410, the process 1400 ends. However, if at the step 1408 the multidimensional vector 1202 is determined to be a new species, the new species may be created and configured at step 1412. In a typical embodiment, the new species may be configured to have, for example, a pay rate that is calculated as a function of a distance from species in the collection of similar species. Following the step 1412, the process 1400 ends.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method comprising:
configuring, by a computer system comprising computer hardware, a human-capital-management (HCM) master taxonomy and a HCM language library;
wherein the HCM master taxonomy comprises a plurality of levels that range from more general to more specific, each level of the plurality of levels comprising a plurality of nodes;
wherein the plurality of levels comprises a job-species level and a job-family level, the job-species level comprising a level of greatest specificity in the plurality of levels, the job-family level comprising a level of specificity immediately above the job-species level;
transforming, by the computer system, human-capital information via the HCM language library;
classifying, by the computer system the transformed human-capital information into a job-family node selected from the plurality of nodes at the job-family level;
analyzing, by the computer system, selected attributes of a plurality of job-species nodes, the plurality of job species comprising ones of the plurality of nodes at the job-species level that are positioned beneath the job-family node; and
wherein the analyzing comprises:
identifying differences between node attributes of the plurality of job species;
for each identified difference of the identified differences, analyzing an impact of the identified difference on a spotlight attribute; and
determining one or more of the node attributes to be key performance indicators (KPIs) for the spotlight attribute.

2. The method of claim 1, wherein configuring a HCM library and a HCM master taxonomy comprises creating a plurality of subject dictionaries, the HCM library comprising the plurality of subject dictionaries.

3. The method of claim 2, wherein configuring a HCM library and a HCM master taxonomy comprises integrating standard dictionary words and terms into the plurality of subject dictionaries.

4. The method of claim 2, wherein configuring a HCM library and a HCM master taxonomy comprises creating and populating at least one HCM-contextual dictionary selected from a group consisting of: an abbreviation dictionary, an inference dictionary and a noise-words dictionary.

5. The method of claim 2, wherein the plurality of subject dictionaries comprises a job dictionary, an organization dictionary, a product dictionary, a date dictionary, a place dictionary and a person dictionary.

6. The method of claim 1, wherein the transforming comprises:
parsing the human-capital information to yield a plurality of linguistic units; and
mapping the plurality of linguistic units to a plurality of subject dictionaries, the plurality of subject dictionaries defining a HCM vector space.

7. The method of claim 6, wherein the mapping comprises projecting the plurality of linguistic units onto the HCM vector space, the projecting yielding a multidimensional vector.

8. The method of claim 7, wherein the mapping comprises:
for each linguistic unit of the plurality of linguistic units, producing one or more possible meanings for the linguistic unit; and wherein each of the one or more possible meanings has magnitude and direction relative to the HCM vector space.

9. The method of claim 8, wherein the production of the one or more possible meanings comprises, for each linguistic unit of the plurality of linguistic units:
performing a spell check; and
referencing an inference dictionary, the HCM language library comprising the inference dictionary.

10. The method of claim 6, wherein:
the human-capital information comprises unstructured data; and
the parsing comprises linguistically analyzing the plurality of linguistic units.

11. The method of claim 6, wherein:
the human-capital information comprises structured data; and
the parsing comprises following a known structure for the structured data to obtain the plurality of linguistic units.

12. The method of claim 7, wherein the classifying comprises:
measuring a distance between the vector-space projection and a vector-space measurement at each node of the plurality of nodes for at least a portion of the plurality of levels;
determining a placement of the transformed human-capital information into the family node based on the measured distance.

13. The method of claim 12, wherein the measuring comprises measuring a distance between the vector-space projection and a vector-space measurement at each node of the plurality of nodes for each level of the plurality of levels that is above the job-species level.

14. The method of claim 12, the method comprising:
wherein, for each of the plurality of levels, each node of the plurality of nodes comprises a plurality of node attributes, each node attribute of the plurality of node attributes having associated therewith a bit flag;
wherein the bit flag comprises performance-optimization information regarding one or more siblings of the node; and
via the performance-optimization information, determining that the one or more siblings need not be measured in the measuring responsive to a condition for action being satisfied.

15. The method of claim 1, wherein the analyzing of an impact upon the spotlight attribute comprises statistically measuring the impact.

16. The method of claim 15, wherein the spotlight attribute is a pay rate for a human resource.

17. The method of claim 1, the method comprising determining, via the determined KPIs, that the transformed human-capital information should be placed into one of the plurality of job-species nodes.

18. The method of claim 1, the method comprising determining, via the determined KPIs, that a new job-species node should be created.

19. The method of claim 17, the method comprising:
responsive to the determination that the transformed human-capital information should be placed into one of the plurality of job-species node comprises, classifying the transformed human-capital information into a selected job-species node from the plurality of job-species nodes.

20. The method of claim 18, the method comprising:
responsive to the determination that a new job-species node should be created, configuring a new job-species node beneath the job-family node.

21. The method of claim 1, wherein:
the plurality of levels of the HCM master taxonomy comprises a job-domain level, a job-category level, a job-subcategory level and a job-class level;
the job-class level comprises a level of specificity immediately above the job-family level;
the job-subcategory level comprises a level of specificity immediately above the job-class level;
the job-category level comprises a level of specificity immediately above the job-subcategory level; and
the job-domain level comprises a level of specificity immediately above the job-category level.

22. A computer-program product comprising a non-transitory computer-usable medium having computer-readable program code embodied therein, the computer-readable program code adapted to be executed to implement a method comprising:
configuring a human-capital-management (HCM) master taxonomy and a HCM language library;
wherein the HCM master taxonomy comprises a plurality of levels that range from more general to more specific, each level of the plurality of levels comprising a plurality of nodes;
wherein the plurality of levels comprises a job-species level and a job-family level, the job-species level comprising a level of greatest specificity in the plurality of levels, the job-family level comprising a level of specificity immediately above the job-species level;
transforming human-capital information via the HCM language library;
classifying the transformed human-capital information into a job-family node selected from the plurality of nodes at the job-family level;
analyzing selected attributes of a plurality of job-species nodes, the plurality of job species comprising ones of the plurality of nodes at the job-species level that are positioned beneath the job-family node; and
wherein the analyzing comprises:
identifying differences between node attributes of the plurality of job species;
for each identified difference of the identified differences, analyzing an impact of the identified difference on a spotlight attribute; and
determining one or more of the node attributes to be key performance indicators (KPIs) for the spotlight attribute.

23. The computer-program product of claim 22, wherein configuring a HCM library and a HCM master taxonomy comprises creating a plurality of subject dictionaries, the HCM library comprising the plurality of subject dictionaries.

24. The computer-program product of claim 23, wherein configuring a HCM library and a HCM master taxonomy comprises integrating standard dictionary words and terms into the plurality of subject dictionaries.

25. The computer-program product of claim 23, wherein configuring a HCM library and a HCM master taxonomy comprises creating and populating at least one HCM-contextual dictionary selected from a group consisting of: an abbreviation dictionary, an inference dictionary and a noise-words dictionary.

26. The computer-program product of claim 23, wherein the plurality of subject dictionaries comprises a job dictionary, an organization dictionary, a product dictionary, a date dictionary, a place dictionary and a person dictionary.

27. The computer-program product of claim 22, wherein the transforming comprises:
   parsing the human-capital information to yield a plurality of linguistic units; and
   mapping the plurality of linguistic units to a plurality of subject dictionaries, the plurality of subject dictionaries defining a HCM vector space.

28. The computer-program product of claim 27, wherein the mapping comprises projecting the plurality of linguistic units onto the HCM vector space, the projecting yielding a multidimensional vector.

29. The computer-program product of claim 28, wherein the mapping comprises:
   for each linguistic unit of the plurality of linguistic units, producing one or more possible meanings for the linguistic unit; and
   wherein each of the one or more possible meanings has magnitude and direction relative to the HCM vector space.

30. The computer-program product of claim 29, wherein the production of the one or more possible meanings comprises, for each linguistic unit of the plurality of linguistic units:
   performing a spell check; and
   referencing an inference dictionary, the HCM language library comprising the inference dictionary.

31. The computer-program product of claim 27, wherein:
   the human-capital information comprises unstructured data; and
   the parsing comprises linguistically analyzing the plurality of linguistic units.

32. The computer-program product of claim 27, wherein:
   the human-capital information comprises structured data; and
   the parsing comprises following a known structure for the structured data to obtain the plurality of linguistic units.

33. The computer-program product of claim 28, wherein the classifying comprises:
   measuring a distance between the vector-space projection and a vector-space measurement at each node of the plurality of nodes for at least a portion of the plurality of levels;
   determining a placement of the transformed human-capital information into the family node based on the measured distance.

34. The computer-program product of claim 33, wherein the measuring comprises measuring a distance between the vector-space projection and a vector-space measurement at each node of the plurality of nodes for each level of the plurality of levels that is above the job-species level.

35. The computer-program product of claim 33, the method comprising:
   wherein, for each of the plurality of levels, each node of the plurality of nodes comprises a plurality of node attributes, each node attribute of the plurality of node attributes having associated therewith a bit flag;
   wherein the bit flag comprises performance-optimization information regarding one or more siblings of the node; and
   via the performance-optimization information, determining that the one or more siblings need not be measured in the measuring responsive to a condition for action being satisfied.

36. The computer-program product of claim 22, wherein the analyzing of an impact upon the spotlight attribute comprises statistically measuring the impact.

37. The computer-program product of claim 36, wherein the spotlight attribute is a pay rate for a human resource.

38. The computer-program product of claim 22, the method comprising determining, via the determined KPIs, that the transformed human-capital information should be placed into one of the plurality of job-species nodes.

39. The computer-program product of claim 22, the method comprising determining, via the determined KPIs, that a new job-species node should be created.

40. The computer-program product of claim 38, the method comprising:
   responsive to the determination that the transformed human-capital information should be placed into one of the plurality of job-species node comprises, classifying the transformed human-capital information into a selected job-species node from the plurality of job-species nodes.

41. The computer-program product of claim 38, the method comprising:
   responsive to the determination that a new job-species node should be created, configuring a new job-species node beneath the job-family node.

42. The computer-program product of claim 22, wherein:
   the plurality of levels of the HCM master taxonomy comprises a job-domain level, a job-category level, a job-subcategory level and a job-class level;
   the job-class level comprises a level of specificity immediately above the job-family level;
   the job-subcategory level comprises a level of specificity immediately above the job-class level;
   the job-category level comprises a level of specificity immediately above the job-subcategory level; and
   the job-domain level comprises a level of specificity immediately above the job-category level.

* * * * *